US010339806B2

(12) United States Patent
Hamada et al.

(10) Patent No.: US 10,339,806 B2
(45) Date of Patent: Jul. 2, 2019

(54) TRAFFIC CONTROL SERVER AND SYSTEM

(71) Applicant: HITACHI CONSTRUCTION MACHINERY CO., LTD., Tokyo (JP)

(72) Inventors: Tomoyuki Hamada, Tsuchiura (JP); Hidefumi Ishimoto, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 115 days.

(21) Appl. No.: 15/506,262

(22) PCT Filed: Mar. 3, 2015

(86) PCT No.: PCT/JP2015/056256
§ 371 (c)(1),
(2) Date: Feb. 24, 2017

(87) PCT Pub. No.: WO2016/139757
PCT Pub. Date: Sep. 9, 2016

(65) Prior Publication Data
US 2018/0068561 A1 Mar. 8, 2018

(51) Int. Cl.
*G05D 1/02* (2006.01)
*G08G 1/00* (2006.01)
(Continued)

(52) U.S. Cl.
CPC ..... *G08G 1/096708* (2013.01); *G05D 1/0289* (2013.01); *G05D 1/0297* (2013.01);
(Continued)

(58) Field of Classification Search
CPC .... G05D 1/0289; G05D 1/0297; G08G 1/052; G08G 1/096725; G08G 1/096741; G08G 1/096775; G08G 1/207
(Continued)

(56) References Cited

U.S. PATENT DOCUMENTS 6,246,932 B1 6/2001 Kageyama et al.
6,292,725 B1 9/2001 Kageyama et al.

FOREIGN PATENT DOCUMENTS

JP 2000-339029 A 12/2000
JP 2001-109519 A 4/2001
(Continued)

OTHER PUBLICATIONS

International Search Report of PCT/JP2015/056256 dated May 26, 2015.

*Primary Examiner* — Maceeh Anwari
(74) *Attorney, Agent, or Firm* — Mattingly & Malur, PC

(57) ABSTRACT

A traffic control server 31 controls traffic for a first vehicle 70 traveling on an outgoing lane and a second vehicle 20 traveling on a return lane and having attributes that are different from the first vehicle 70. The traffic control server 31 is provided with a travel-permitted zone setting unit 331*b* for setting a first travel-permitted zone 100, which is a partial zone of the outgoing lane and in which travel of the first vehicle 70 is permitted, and a second travel-permitted zone 200, which is a partial zone of the return lane and in which travel of the second vehicle 20 is permitted. The travel-permitted zone setting unit 331*b* sets the first travel-permitted zone and the second travel-permitted zone 200 so as to cause the second vehicle to stop or decelerate and the first vehicle to travel when the first vehicle and the second vehicle pass each other.

8 Claims, 13 Drawing Sheets

(51) Int. Cl.
  *G08G 1/16* (2006.01)
  *G08G 1/052* (2006.01)
  *G08G 1/0967* (2006.01)
(52) U.S. Cl.
  CPC ....... *G08G 1/052* (2013.01); *G08G 1/096725* (2013.01); *G08G 1/096741* (2013.01); *G08G 1/096775* (2013.01); *G08G 1/207* (2013.01); *G05D 2201/021* (2013.01); *G08G 1/164* (2013.01); *G08G 1/166* (2013.01)
(58) Field of Classification Search
  USPC .......................................................... 701/119
  See application file for complete search history.

(56) References Cited

FOREIGN PATENT DOCUMENTS

| | | | |
|---|---|---|---|
| JP | 2013-123963 A | 6/2013 | |
| WO | 98/37468 A1 | 8/1998 | |
| WO | WO1998037468 A1 | * | 8/1998 |

\* cited by examiner

FIG. 5A

| VEHICLE ID INFORMATION | VEHICLE TYPE | MANNED VEHICLE FLAG | TRAVEL MODE |
|---|---|---|---|
| ID70 | LIGHT VEHICLE | 1 | -- |
| ID20-1 | DUMP TRUCK | 0 | AUTONOMOUS TRAVEL |
| ID20-2 | DUMP TRUCK | 1 | MANUAL TRAVEL |

FIG. 5B

| VEHICLE ID INFORMATION | TRAVEL-PERMITTED ZONE | | TRAVEL PERMISSION RESTRICTED ZONE | | QUASI-TRAVEL-PERMITTED ZONE | | LANE | VEHICLE SPEED |
|---|---|---|---|---|---|---|---|---|
| | FORWARD BOUNDARY POINT | BACKWARD BOUNDARY POINT | FORWARD BOUNDARY POINT | BACKWARD BOUNDARY POINT | FORWARD BOUNDARY POINT | BACKWARD BOUNDARY POINT | | |
| ID70 | N12 | N11 | N21 | N22 | J32 | J31 | APPROACH LANE | V1 |
| ID20-1 | N23 | N24 | null | null | null | null | RETURN LANE | V2 |
| ID20-2 | N13 | N14 | null | null | null | null | APPROACH LANE | V3 |

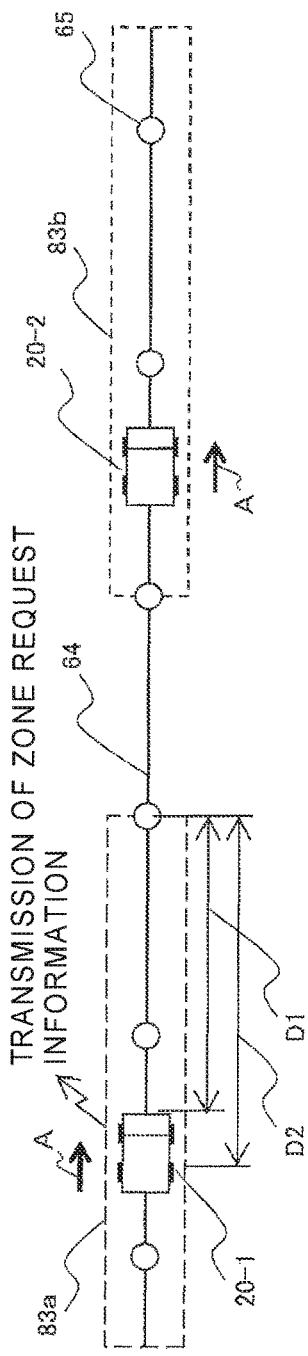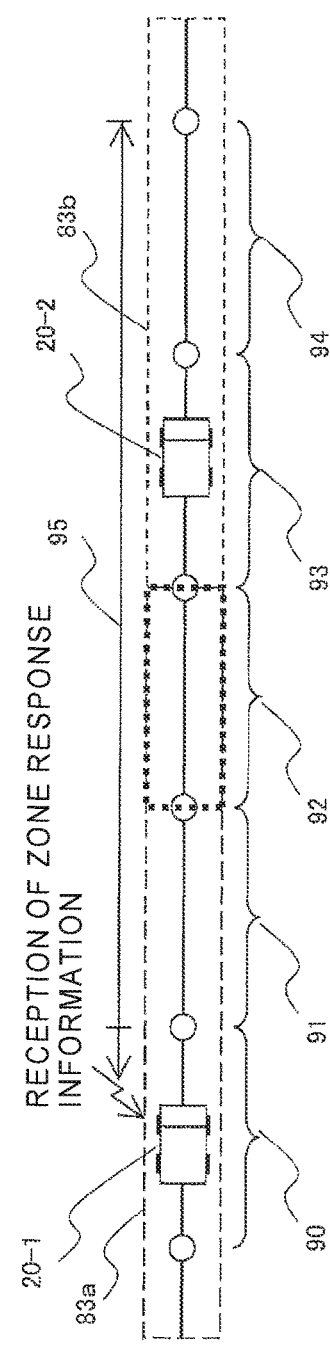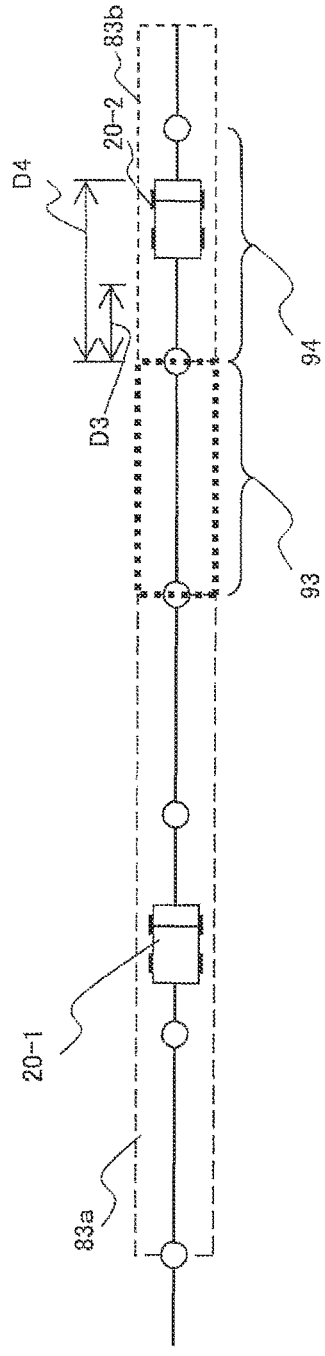

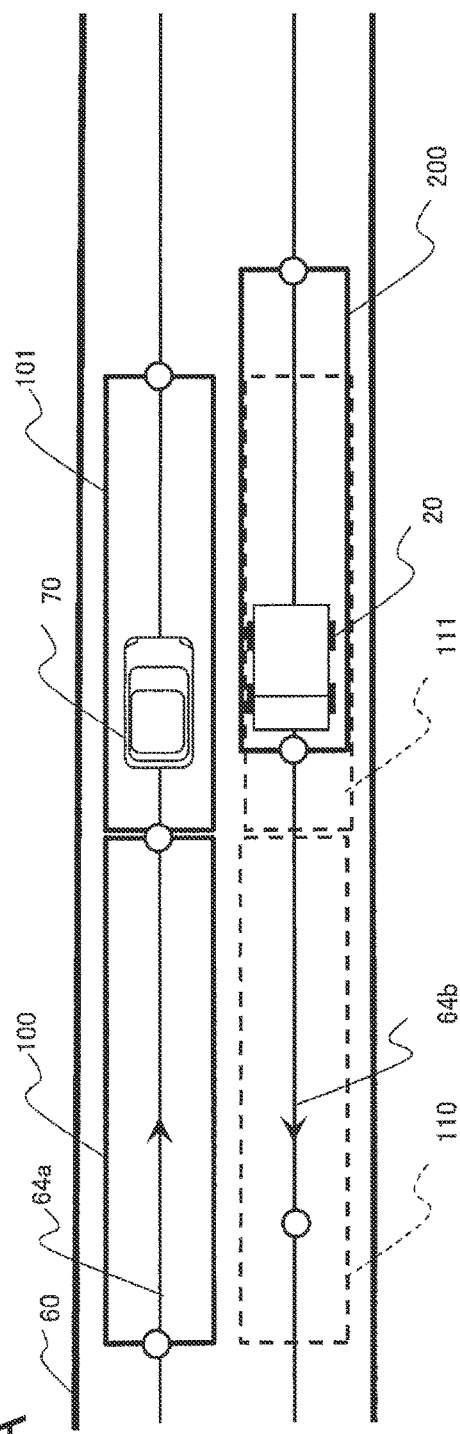
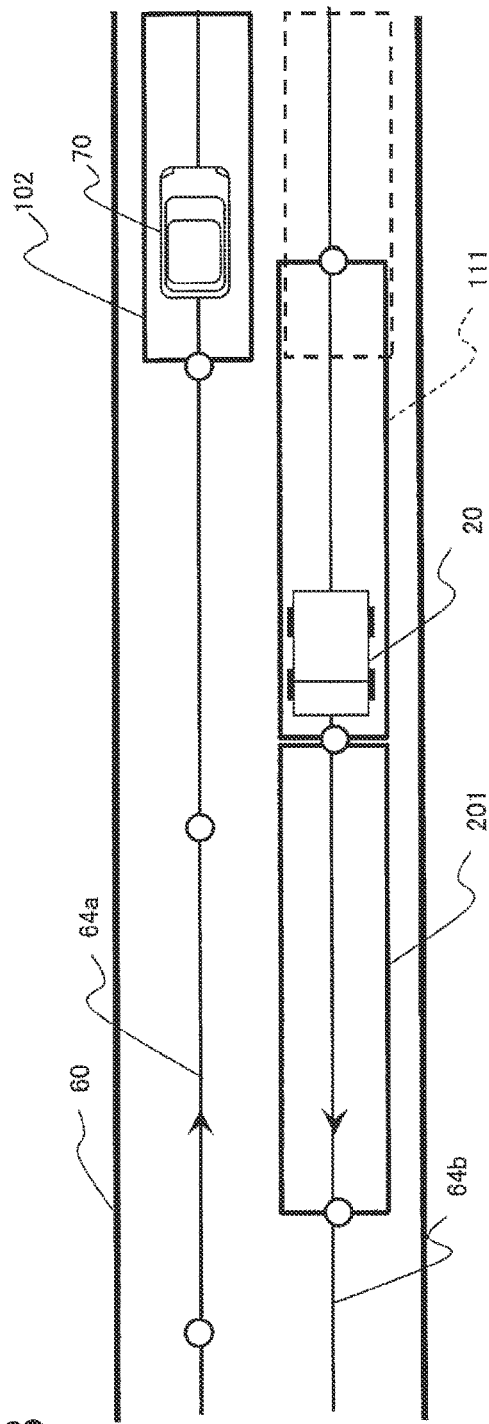

TRAFFIC CONTROL SERVER AND SYSTEM

TECHNICAL FIELD

This invention relates to a traffic control server and system, and especially to a technology for controlling interference between vehicles themselves that are traveling in a mine.

BACKGROUND ART

When allowing unmanned vehicles, which haul excavated ore, such as dump trucks to autonomously travel in a surface mine or the like, it is needed to control the unmanned vehicles so that they will not interfere with manned vehicles such as bulldozers and graders that keep up roads, sprinkler vehicles that sprinkle water to avoid raising dust, and light vehicles that perform patrolling tasks.

As a technology for such control, Patent Document 1, for example, discloses the following configurations: "An unmanned vehicle finds out a circle defining a distance obtained when a manned vehicle finally acquired (received) by an inter-vehicle communication device moves from a position P (position at a certain point of time) based on the positional data of the manned vehicle to a prescribed point of time in the future at a maximum speed as a radius around the position P on the basis of the position P and estimates the area of a programmed traveling route in the circle as the existence range of the vehicle. The unmanned vehicle judges whether its own vehicle position interferes with the circle or not. (An extract from the Abstract)".

PRIOR ART DOCUMENT

Patent Document

Patent Document 1: JP 2000-330029 A

DISCLOSURE OF THE INVENTION

Problem to be Solved by the Invention

In Patent Document 1, while the communication between the unmanned vehicle and manned vehicle and a traffic control center is lost, the mutual positional relationship between the unmanned vehicle and the manned vehicle cannot be ascertained so that no appropriate control can be performed. It is, therefore, necessary to take a measure such as stopping the vehicles even if there is no danger of interference. Consequently, there is a problem that the efficiency of work decreases if a communication loss occurs. Especially when the manned vehicle and the unmanned vehicle pass each other on a haul road, their relative speed is high, and moreover, the distance between the vehicles is close. Interference of the manned vehicle with the oncoming vehicle, for example, due to traveling of the manned vehicle with a departure from the travel route may potentially be accompanied by severe damage. Accordingly, a technology is needed to reduce effects of a communication loss upon allowing the unmanned vehicle and the manned vehicle to safely pass each other on the haul road.

With the foregoing circumstances in view, the present invention has as an object thereof the provision of a technology that, even if there is a communication loss especially upon passing of an unmanned vehicle by an oncoming manned vehicle on a haul road, can control to avoid interference between the unmanned vehicle and the manned vehicle without inducing a reduction in work efficiency.

Means for Solving the Problem

To achieve the above-described object, the present invention is characterized by a traffic control server for performing traffic control of a first vehicle, which is traveling in an approach lane in a mine where the approach lane and a return lane are provided in parallel to each other, and a second vehicle, which is different in attribute from the first vehicle and is traveling in the return lane. The traffic control server includes a travel-permitted zone setting unit configured to set a first travel-permitted zone as a partial zone, where the first vehicle is allowed to travel, in the approach lane and a second travel-permitted zone as another partial zone, where the second vehicle is allowed to travel, in the return lane. The travel-permitted zone setting unit is configured to set the first travel-permitted zone and second travel-permitted zone so that, when the first vehicle and the second vehicle pass each other, the second vehicle is stopped or slowed down and the first vehicle is allowed to travel.

The present invention is also characterized by a traffic control system including a traffic control server for performing traffic control of a first vehicle, which is traveling in an approach lane in a mine where the approach lane and a return lane are provided in parallel to each other, and a second vehicle, which is different in attribute from the first vehicle and is traveling in the return lane, first onboard terminal device mounted on the first vehicle, and second onboard terminal device mounted on the second vehicle. The traffic control server and the first onboard terminal device and second onboard terminal device are connectable for communication. The traffic control server includes a travel-permitted zone setting unit configured to set a first travel-permitted zone as a partial zone, where the first vehicle is allowed to travel, in the approach lane and a second travel-permitted zone as another partial zone, where the second vehicle is allowed to travel, in the return lane, and configured to set the first travel-permitted zone and second travel-permitted zone so that, when the first vehicle and the second vehicle pass each other, the second vehicle is stopped or slowed down and the first vehicle is allowed to travel, and a server-side communication control unit configured to transmit first zone response information, which indicates the first travel-permitted zone, to the first onboard terminal device and second zone response information, which indicates the second travel-permitted zone, to the second onboard terminal device. The first onboard terminal device includes a first terminal-side communication control unit configured to receive the first zone response information. The second onboard terminal device includes a second terminal-side communication control unit configured to receive the second zone response information.

Advantageous Effects of the Invention

According to the present invention, it is possible to provide a technology that, even if there is a communication loss especially upon passing of an unmanned vehicle by an oncoming manned vehicle on a haul road, can control to avoid interference between the unmanned vehicle and the manned vehicle without inducing a reduction in work efficiency. Objects, configurations and advantageous effects other than those described above will become apparent from the following description of embodiments.

BRIEF DESCRIPTION OF THE DRAWINGS

FIGS. 5A and 5B are tables showing examples of data to be stored in a travel-permitted zone information database, in which FIG. 5A shows an example of vehicle management information for managing the vehicles that travel on the haul road 60, and FIG. 5B shows an example of zone information that indicates travel-permitted zones given to the respective vehicles.

FIGS. 8A, 8B and 8C are diagrams illustrating travel-permitted zone setting processing, in which FIG. 8A shows travel-permitted zones set for the respective dump trucks, FIG. 8B shows a travel-permitted zone newly set for one of the dump trucks, and FIG. 8C shows a vacated zone.

FIGS. 9A and 9B are diagrams illustrating setting examples of a travel permission restricted zone, in which FIG. 9A illustrates a state that a travel permission restricted zone does not overlap a travel-permitted zone for the oncoming vehicle, and FIG. 9B illustrates a state that the dump truck has stopped as the setting of a new travel-permitted zone was not feasible by being hampered with a travel permission restricted zone.

FIGS. 10A and 10B are diagrams illustrating setting examples of a travel permission restricted zone, in which FIG. 10A illustrates a state that a travel permission restricted zone for the manned vehicle has been set overlapping a travel-permitted zone for a dump truck, and FIG. 10B illustrates a state that a travel permission restricted zone has been canceled and a new travel-permitted zone has been set for the dump truck.

FIGS. 12A and 12B are diagrams showing setting examples of a quasi-travel-permitted zone, in which FIG. 12A shows an example of merging and FIG. 12B shows an example of crossing.

FIGS. 13A and 13B are diagrams illustrating invalidation of map data, in which FIG. 13A illustrates an example including a merging point and FIG. 13B illustrates an example including a crossing point.

MODES FOR CARRYING OUT THE INVENTION

Figure 1:
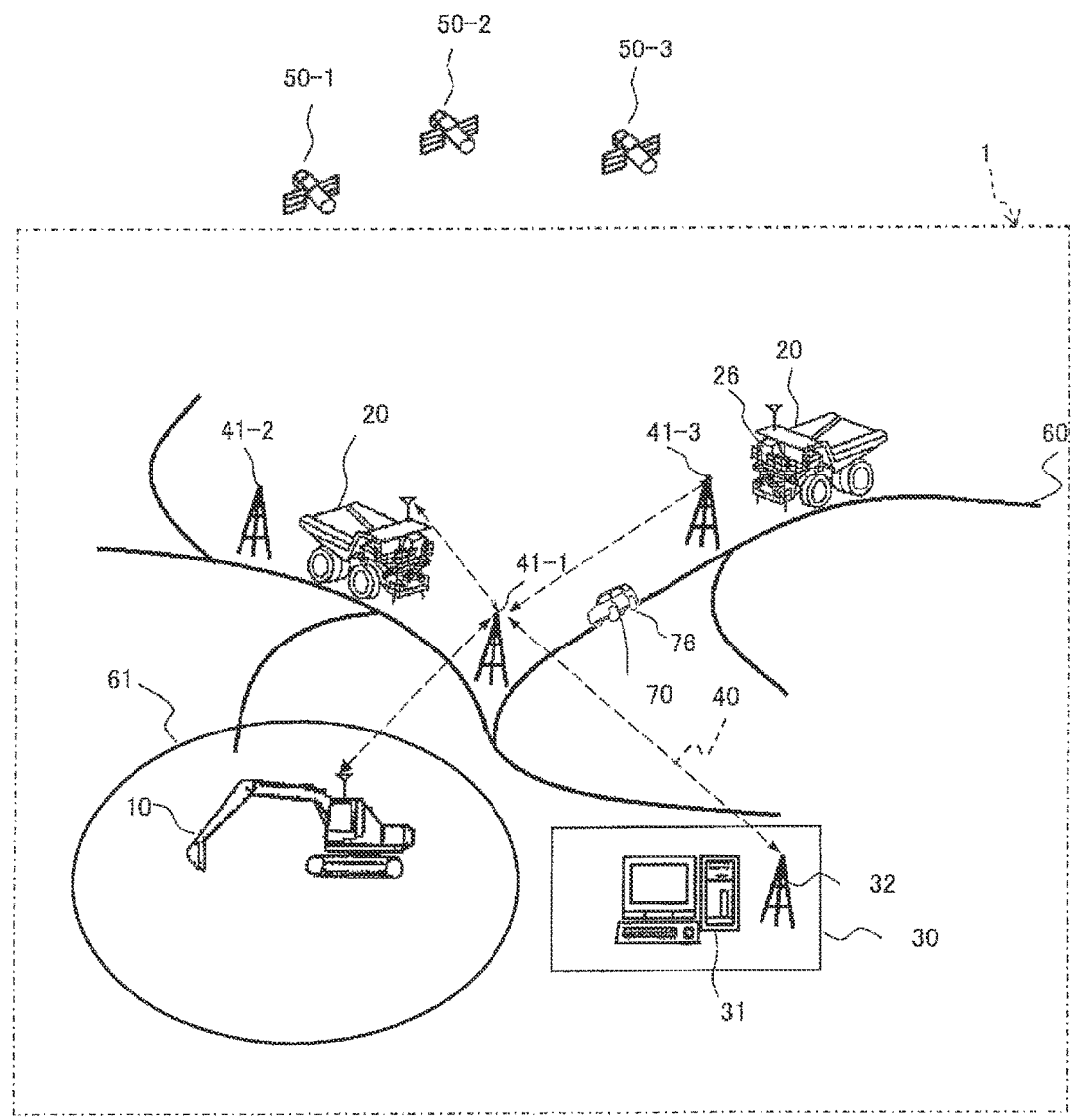
FIG. 1 is a view illustrating the schematic configuration of a traffic control system according to an embodiment.

The embodiments of the present invention will hereinafter be described in detail on the basis of the drawings. It is to be noted that throughout the drawings for describing the embodiments, members having the same functions are identified by the same or related designations, and their repeated descriptions will be eliminated. It is also to be noted that in the following embodiments, the descriptions of the same or similar parts will not be repeated in principle except as specifically needed.

The embodiments each relate to a traffic control server for performing control of passing of a first vehicle, which is traveling in an approach lane in a mine where the approach lane and a return lane are provided in parallel to each other, by an oncoming second vehicle, which is different in attribute from the first vehicle and is traveling in the return lane.

The first vehicle mentioned here is a vehicle that is allowed to travel preferentially over the second vehicle. If a manned vehicle and unmanned vehicle exist together, the existence or non-existence of an operator is adopted as an attribute, and the first vehicle is taken as the manned vehicle while the second vehicle is taken as the unmanned vehicle. A manned vehicle is a vehicle to be operated by an operator on board on the vehicle, and can be, for example, a bulldozer, a grader, a sprinkler vehicle, or a light vehicle. On the other hand, an unmanned vehicle is an autonomously traveling vehicle, and in the embodiments, will be described using an autonomously-traveling, mining dump truck.

It is to be noted that, if the dump truck is provided with a mechanism to be steered by an operator in addition to the autonomously traveling function, the present invention may be applied by considering the dump truck, which is traveling by the autonomously traveling function, as an unmanned vehicle and the dump truck as a manned vehicle when it is operated by an operator on board on the dump truck. Even in the case of dump trucks of the same vehicle class (body size), traffic control can be performed by taking them as those which are different in attribute.

As a difference in attribute, the load states of dump trucks may be used. In this case, the first vehicle can be an unloaded dump truck while the second vehicle can be a dump truck with a payload carried thereon. As an alternative, the first vehicle can be a dump truck with a payload carried thereon while the second vehicle can be an unloaded dump truck.

Further, the term "approach lane" is a designation for a lane in which the first vehicle travels while the oncoming lane is called "a return lane". These designations are not irrevocably unchangeable, and depending on the traveling direction of the first vehicle, can change as needed. If the first vehicle travels, for example, toward an excavation site to be described subsequently herein, the lane toward the excavation site is called "an approach lane" while the lane from the excavation site toward a dumping site is called "a return lane".

First Embodiment

The first embodiment is an embodiment in which, when a manned vehicle and an autonomously-traveling dump truck pass each other, a travel permission is given to the dump truck by avoiding a travel permission restricted zone and a quasi-travel-permitted zone, both of which will be described subsequently herein.

On the basis of FIG. 1, a description will first be made about the schematic configuration of the traffic control system according to the first embodiment.

The traffic control system 1 illustrated in FIG. 1 has been configured by communicably connecting an excavator 10, dump trucks 20 (which correspond to unmanned vehicles) and a manned vehicle 70 such as a light vehicle for supervision or transportation of employees, etc. with a traffic control server 31 via a wireless communication network 40. The excavator 10 performs loading work of rock and ore at a loading site 61 as a working site, which includes a quarry and the loading site, in a mine or the like. The dump trucks 20 consist of autonomously-traveling vehicles for hauling payloads such as rock and ore loaded from the excavator 10. The traffic control server 31 is installed at a traffic control center 30 that is near or remote from the quarry.

The dump trucks 20 haul payloads by traveling back and forth between the loading site 61 and an unillustrated dumping site along a haul road 60 set beforehand in the mine.

In the mine, plural wireless base stations 41-1,41-2,41-3 are arranged. Via these wireless base stations 41-1,41-2,41-3, wire communication radio waves are transmitted and received.

The excavator 10, individual dump trucks 20 and manned vehicle 70 are each provided with position calculating device (an illustration of which is eliminated in FIG. 1) for acquiring the position of the own vehicle by receiving positioning radio waves from at least three navigation satellites 50-1,50-2,50-3 in GNSS (Global Navigation Satellite System). As the GNSS, GPS (Global Positioning System), GLONASS or GALILEO may be used, for example. In practice, plural dump trucks 20 and plural manned vehicles 70 are operating together and each perform wireless communication with the traffic control server 31.

On each dump truck 20, on-board terminal device (hereinafter referred to as "the dump-truck terminal device") 26 is mounted to perform autonomous traveling in accordance with an instruction from the traffic control server 31.

Similarly, on the manned vehicle 70, on-board terminal device (hereinafter referred to as "the manned vehicle terminal device") 76 is also mounted to receive an instruction from the traffic control server 31 and to display the same.

The traffic control server 31 is connected to an antenna 32 for connection to the wireless communication network 40. The traffic control server 31 communicates with each of the dump-truck terminal device 26 and manned vehicle terminal device 76 via the antenna 32 and wireless communication network 40.

Figure 2:
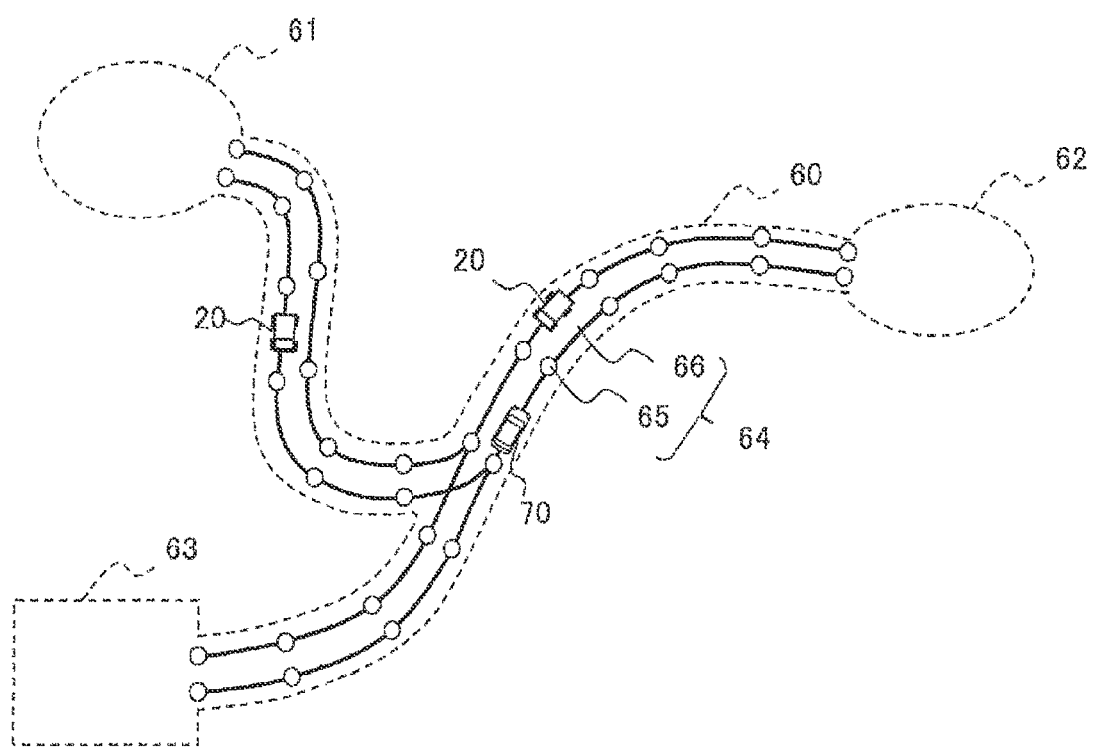
FIG. 2 is a diagram illustrating a haul road 60 of FIG. 1 in detail, and shows a configuration example of a site in a surface mine, where dump trucks 20 and a manned vehicle 70 are traveling.

FIG. 2 is a diagram illustrating the haul road 60 of FIG. 1 in detail, and shows a configuration example of a site in the surface mine, where the dump trucks 20 and manned vehicle 70 are traveling. The haul road 60 connects the loading site 61 with a dumping site 62 and dumping site 63. The dump trucks 20 are loaded with overburden or ore at the loading site 61, and travel on the haul road 60 to haul it to the dumping site 62 or 63.

The loading site 61 is a working site where the overburden or ore excavated by the excavator 10 is loaded on the dump trucks 20.

The dumping site 62 is a working site, where the overburden or like hauled by the dump trucks 20 from the excavation site is dumped and is then spread in a layer form or a radial form.

The dumping site 63 is a working site, where a crusher (not illustrated) that subjects ore to crushing processing is installed. The ore crushed by the crusher is conveyed by a belt conveyor or the like to a shipping site for transportation by freight cars or to disposal facilities or the like.

On the haul road 60, two lanes different in the advancing direction of each dump truck 20 are arranged. On each lane, a travel route 64 is set as a target to be traced when each dump truck 20 autonomously travels. In the following, the lane may be described by rewording it as "the travel route" in some instances.

The travel route 64 is defined as the coordinate values of individual points (nodes) 65 set on a map. The route between adjacent nodes is called a "sublink" 66. Map information of the travel route 64, (the map information corresponding to the map information of each lane), is defined including these nodes 65 and sublinks 66. This map information is commonly used at the traffic control server 31, dump-truck terminal device 26 and manned-vehicle terminal device 76, and the identical map information is stored in the above-described three constituent elements.

Each dump truck 20 autonomously travels along the travel route 64 by controlling acceleration, deceleration and steering while comparing its own position, which is specified by a positional sensor (GPS), with the coordinate values of the travel route.

Figure 3:
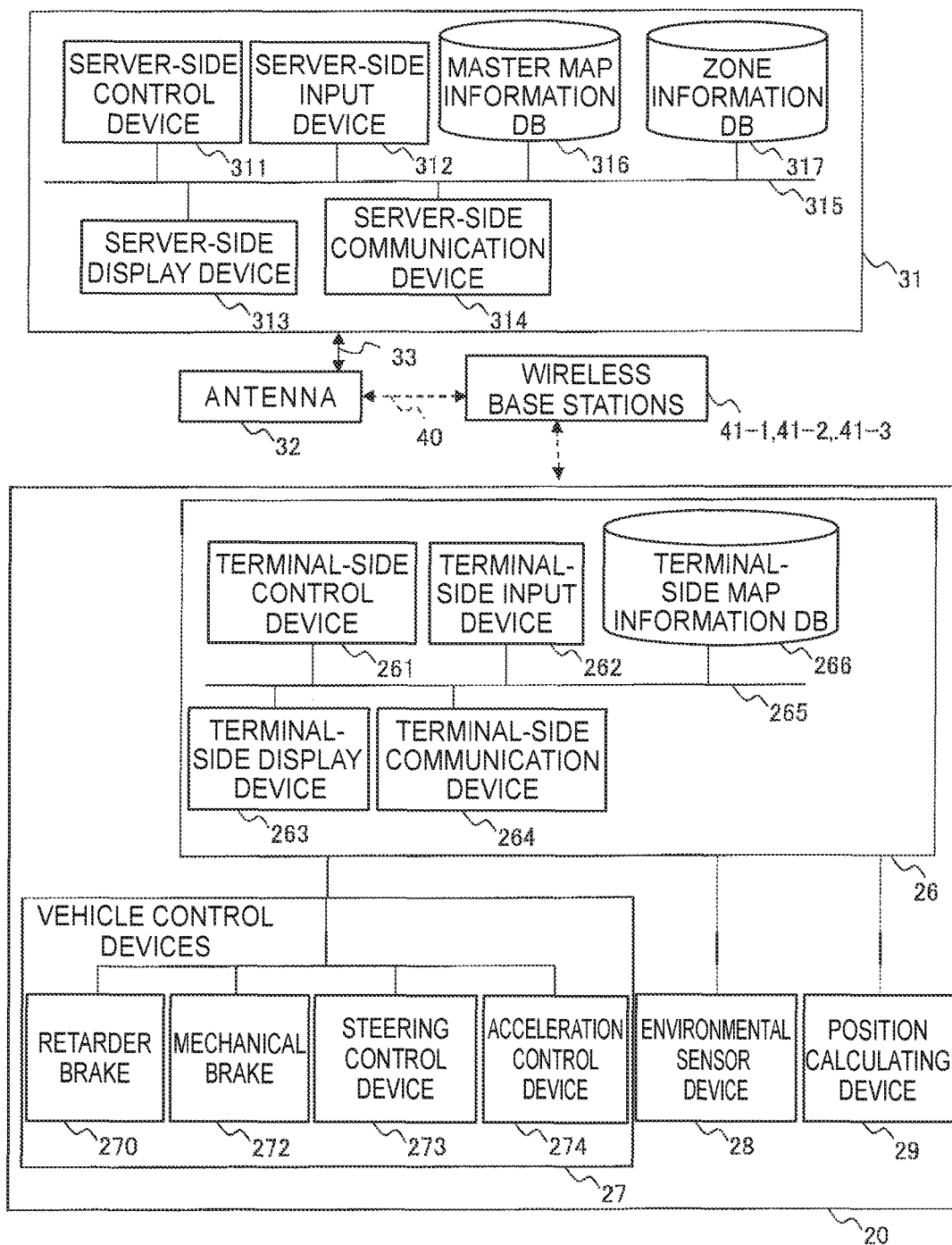
FIG. 3 is a hardware configuration diagram of a traffic control server and dump-truck terminal device.
Figure 4:
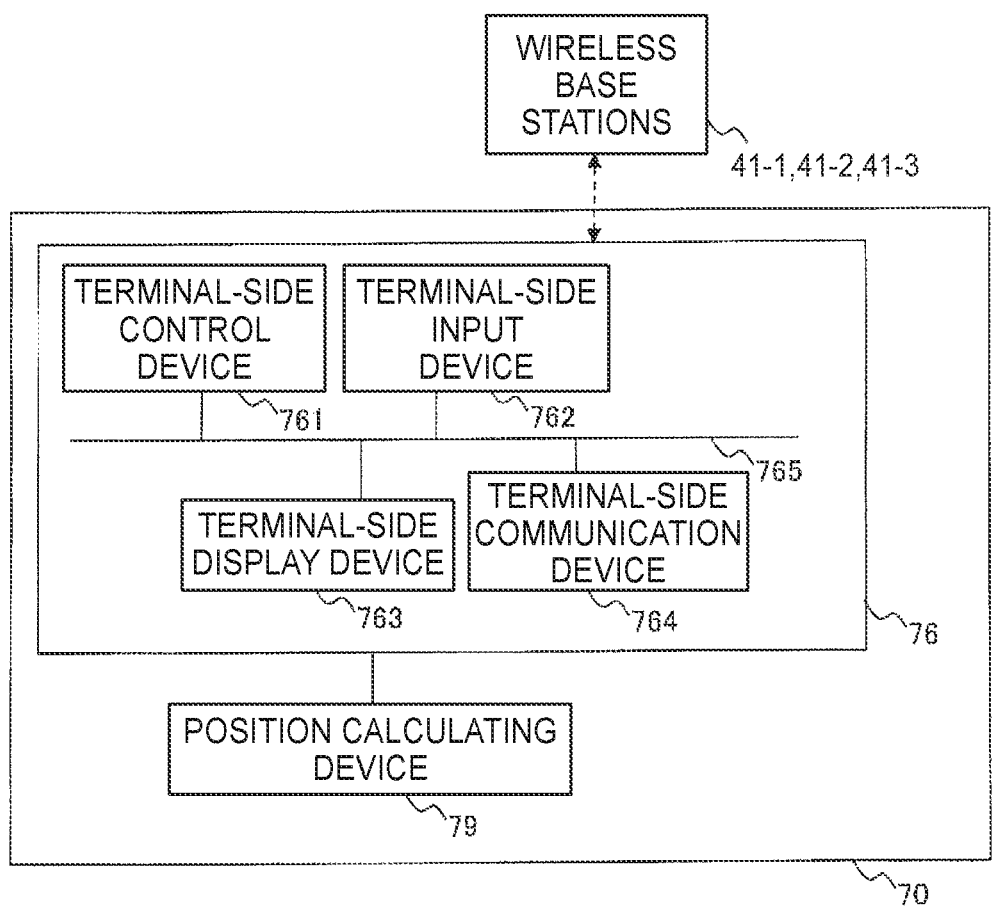
FIG. 4 is a hardware configuration diagram of manned-vehicle terminal device.

Referring next to FIGS. 3 through 5B, a description will be made about the hardware configurations of the traffic control server 31, the dump-truck terminal device 26 of each dump truck 20, and the manned-vehicle terminal device 76 in FIG. 1. FIG. 3 is the hardware configuration diagram of the traffic control server and dump-truck terminal device. FIG. 4 is the hardware configuration diagram of the manned-vehicle terminal device. FIGS. 5A and 5B are tables showing examples of data to be stored in a travel-permitted zone information database, in which FIG. 5A shows an example of vehicle management information for managing the vehicles that travel on the haul road 60, and FIG. 5B shows an example of zone information that indicates travel-permitted zones given to the respective vehicles.

As illustrated in FIG. 3, the traffic control server 31 is configured including server-side control device 311, a server-side input device 312, a server-side display device 313, a server-side communication device 314, a bus 315, a master map information database ("database" will hereinafter be abbreviated as "DB") 316, and a travel-permitted zone information DB (hereinafter abbreviated as "the zone information DB") 317.

The server-side control device 311 serves to control operations of the individual constituent elements of the traffic control server 31, and is configured using hardware, which in addition to an operation and control unit such as CPU (Central Processing Unit), includes storage devices, such as ROM (Read Only Memory) and HDD (Hard Disk Drive), with programs stored therein and to be executed at the traffic control server 31 and RAM (Random Access Memory) to be used as a working area upon execution of the programs by the CPU.

The server-side input device 312 is configured by input devices such as a mouse and keyboard.

The server-side display device 313 is configured by a liquid crystal monitor or the like, and functions as an interface that displays information and provides it for an operator.

The server-side communication device 314 is configured by a device for enabling communicable connection to the wire communication network or wireless communication network 40.

The bus 315 electrically connects the individual constituent elements one another.

The master map information DB 316 is configured using a storage device, such as HDD, that stores information in a non-volatile form. This master map information DB 316 stores map information defined by the position information (coordinate values) of the individual nodes on the haul road 60 and the sublinks connecting the individual nodes. In addition, terrain information of the mine and the absolute coordinates (three-dimensional real coordinates calculated on the basis of positioning radio waves) of the individual nodes may also be contained. Each node is applied with position identification information (hereinafter called "node ID") that specifically identifies the node.

The zone information DB 317 is configured using a storage device, such as HDD, that stores information in a non-volatile form. This zone information DB 317 stores vehicle management information (see FIG. 5A) and zone information (see FIG. 5B).

As the vehicle management information, the followings are stored in association with one another: "vehicle identification information" that specifically identifies each vehicle, "vehicle type" that indicates the type of each vehicle, "manned vehicle identification flag" for identifying whether each vehicle is a manned vehicle or not (the value for each manned vehicle is set at "1", and the value for each unmanned vehicle is set at "0"), and "travel mode" that indicates the currently-set mode when the dump truck 20 is a haul vehicle compatible with both autonomous travel and manual travel that an operator operates on board. Each dump truck 20 in this embodiment is provided with an autonomous travel function and a manned travel function by operator's driving, and, when traveling manually, is handled as a manned vehicle although it is a dump truck. In FIG. 5A, the value of the manned vehicle flag for the dump truck "ID20-2" is set at "1" accordingly.

As the zone information, the followings are stored in association with one another: the "forward boundary point" and "backward boundary point" of a travel-permitted zone currently set for each vehicle, the "forward boundary points" and "backward boundary points" of a travel permission restricted zone and quasi-travel-permitted zone set in association with the travel-permitted zone, "lane" indicating which one of the approach lane and return lane the currently-traveling lane is, and "vehicle speed" indicating a speed in each travel-permitted zone. The node IDs (N11,N12,N23, N24,J31,J32) of the respective forward boundary points and backward boundary points for ID70 in FIG. 5B are the same as those shown in FIG. 12A. It is to be noted that concerning each travel permission restricted zone, the zone may be set by the coordinates of its front and backward boundary points.

As the respective databases described above, only a storage unit with map information and zone information stored therein may be provided, and the server-side control device 311 may perform updating and retrieval processing of their database, or an engine may be incorporated in each DB to perform updating and retrieval processing of its information.

On the other hand, each dump truck 20 is an electric drive dump truck, and as illustrated in FIG. 3, is provided, in addition to the dump-truck terminal device 26, a vehicle control devices 27 that control acceleration, deceleration and steering in accordance with instructions from the dump-truck terminal device 26, an environmental sensor device 28, and position calculating device 29.

The dump-truck terminal device 26 is configured including terminal-side control device 261, a terminal-side input device 262, a terminal-side display device 263, a terminal-side communication device 264, a bus 265, and a terminal-side map information DB 266.

The terminal-side control device 261, terminal-side input device 262, terminal-side display device 263, terminal-side communication device 264, bus 265, and terminal-side map information DB 266 are of the same configurations as the server-side control device 311, server-side input device 312, server-side display device 313, server-side communication device 314, bus 315, and master map information DB 316 (which corresponds to the map data storage unit), and therefore their overlapping descriptions are eliminated.

The vehicle control devices 27 include a retarder brake (regenerative brake) 271, a mechanical brake 272, steering control device 273, and acceleration control device 274. The vehicle control devices 27 is electrically connected to the dump-truck terminal device 26, and allows the dump truck 20 to autonomously travel in accordance with an instruction from the traffic control server 31.

The environmental sensor device 28 is a sensor, such as a millimeter-wave radar or forward camera, for monitoring the surrounding environment of the dump truck, and no particular limitation is imposed on its kind.

The position calculating device 29 device 29 is device, such as GPS, for calculating the current position of the own vehicle.

As illustrated in FIG. 4, similar to the dump-truck terminal device 26, the manned-vehicle terminal device 76 also includes terminal-side control device 761, a terminal-side input device 762, a terminal-side display device 763, a terminal-side communication device 764, and a bus 765, and is connected to position calculating device 79 mounted on the manned vehicle 70. These individual constituent elements are similar to those of the dump-truck terminal device 26, and therefore their overlapping descriptions are eliminated.

Figure 6:
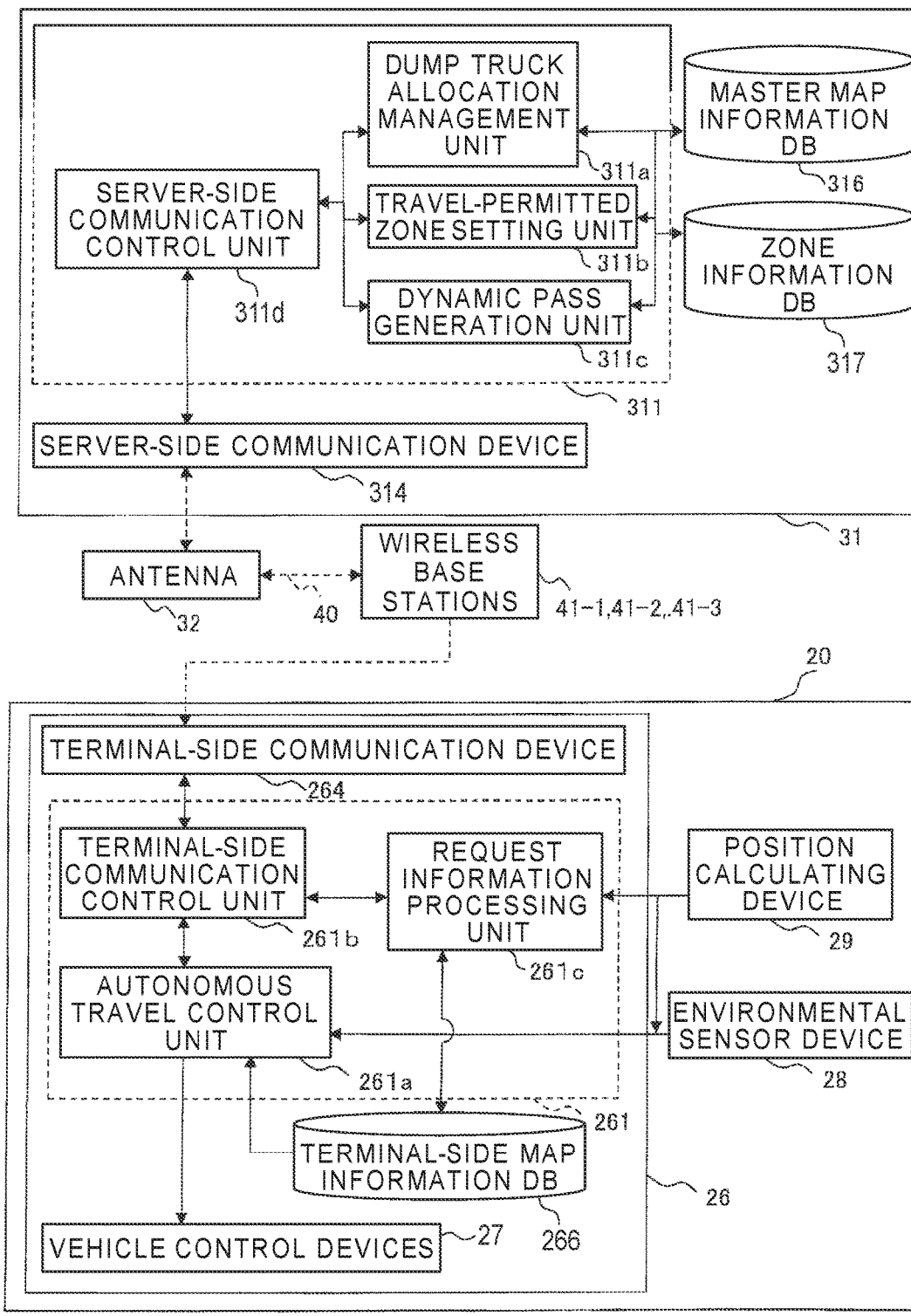
FIG. 6 is a functional block diagram illustrating main functions of the traffic control server and dump-truck terminal device.
Figure 7:
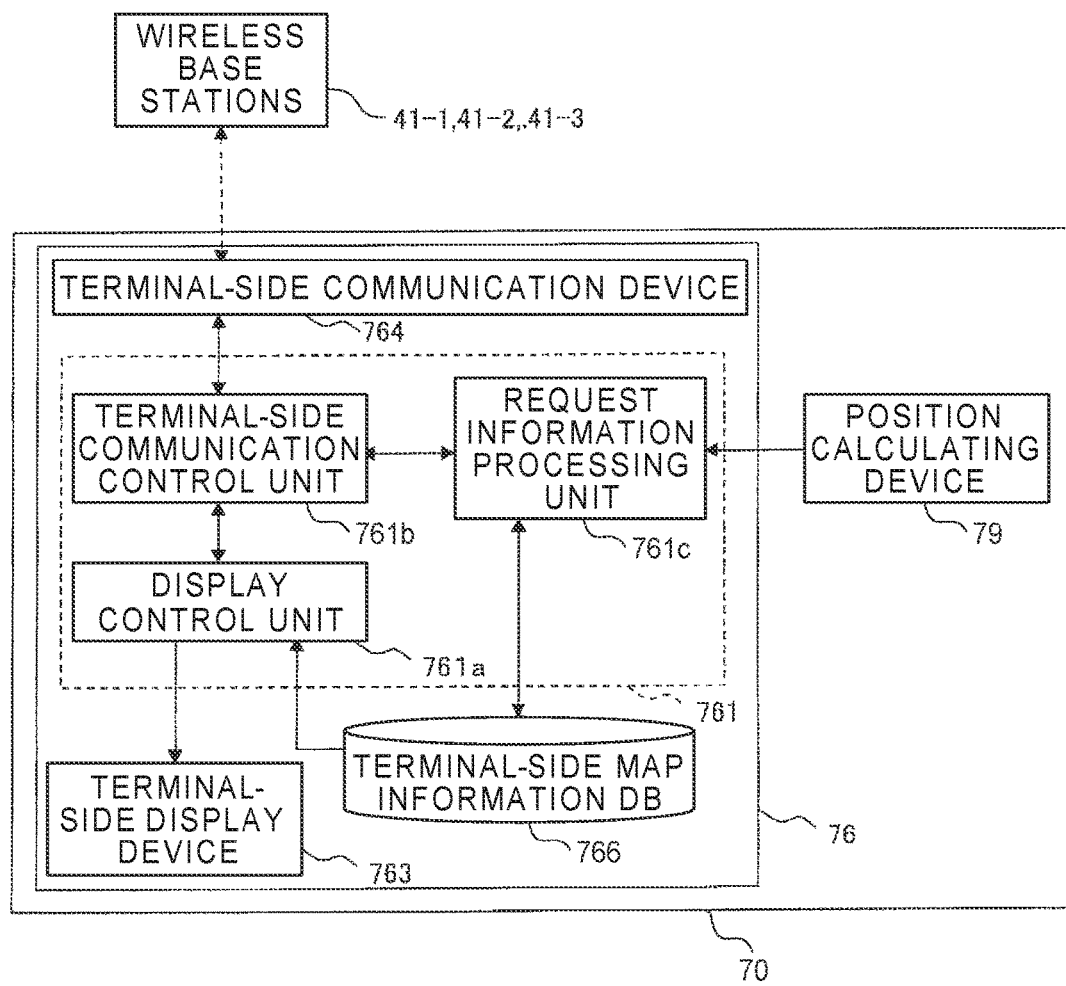
FIG. 7 is a functional block diagram illustrating main functions of the manned-vehicle terminal device.

Referring next to FIG. 6 and FIG. 7, a description will be made about functional configurations of the traffic control server 31, dump-truck terminal device 26, and manned-vehicle terminal device 76. FIG. 6 is a functional block diagram illustrating main functions of the traffic control server and dump-truck terminal device. FIG. 7 is a functional block diagram illustrating main functions of the manned-vehicle terminal device.

As illustrated in FIG. 6, the server-side control device 311 in the traffic control server 31 is provided with a dump truck allocation management unit 311a, a travel-permitted zone setting unit 311b, a dynamic path generation unit 311c, and a server-side communication control unit 311d.

The dump truck allocation management unit 311a sets a destination for each dump truck 20, and with reference to the map information stored in the master map information DB 316, determines a travel route from the current position to the destination.

For each dump truck 20 and the manned vehicle 70, the travel-permitted zone setting unit 311b sets, with reference to the map information and zone information (see FIG. 5B) stored in the master map information DB 316, a first travel-permitted zone as a partial zone, in which traveling of the manned vehicle 70 is permitted, in the approach lane, and a second travel-permitted zone as a partial zone, in which traveling of the dump truck 20 is permitted, in the return lane. Here, the travel-permitted zone setting unit sets the first travel-permitted zone and second travel-permitted zone so that, when the manned vehicle and the dump truck 20 pass each other, the dump truck 20 is stopped or slowed down (this will be described in a third embodiment) and the manned vehicle is allowed to travel.

After the setting of the first travel-permitted zone, the travel-permitted zone setting unit 311b also sets a partial zone, which is in the return lane and is parallel to the first travel-permitted zone, as a travel permission restricted zone associated with the first travel-permitted zone.

If there is a merging point or crossing point in the approach lane, the travel-permitted zone setting unit 311b, after setting a first travel-permitted zone with the merging point or crossing point included therein, also sets an entry zone to the approach lane, the entry zone being on a merging lane that merges into the approach lane or a crossing lane that crosses the approach lane, as a quasi-travel-permitted zone associated with the first travel-permitted zone.

The travel-permitted zone setting unit 311b then sets a second travel-permitted zone by avoiding the travel permission restricted zone and quasi-travel-permitted zone, in other words, so that the newly-set, second travel-permitted zone overlaps neither the travel permission restricted zone nor the quasi-travel-permitted zone.

If upon setting the first travel-permitted zone, the dump truck 20 traveling in a still further partial zone corresponding to the first travel-permitted zone to be set in the oncoming lane has a vehicle speed greater than a predetermined vehicle speed threshold, the travel-permitted zone setting unit 311b restricts the setting of the new first travel-permitted zone. In the first embodiment, the new first travel-permitted zone is set only when the predetermine vehicle speed threshold is zero, in other words, the dump truck 20 in the corresponding zone is at a stop. It is to be noted that the travel-permitted zone setting unit 311b acquires the vehicle speed of the dump truck 20 (including whether it is at a stop or not) as information for the determination of the setting of the first travel-permitted zone by referring to the vehicle speed included in the zone information set for the dump truck 20 or by determining that the vehicle speed is zero if no new second travel-permitted zone has been set for the dump truck 20.

After the setting of the first and second travel-permitted zones, travel permission restricted zone and quasi-travel-permitted zone, the travel-permitted zone setting unit 311b writes them in the zone information. Upon cancellation of the first and second travel-permitted zones, on the other hand, information of the canceled first and second travel-permitted zones and the travel permission restricted zone and quasi-travel-permitted zone associated with them is deleted from the zone information.

The dynamic path generation unit 311c generates a travel route (which will be called "the dynamic path") that is allowed to follow movements of the loading point and dumping points in the loading site 61 and dumping sites 62,63, and transmits the dynamic path to the dump truck 20 for which the dynamic path has been generated.

The server-side communication control unit 311d performs control of wireless communication between the traffic control server 31 and each of the dump-truck terminal device 26 and manned-vehicle terminal device 76. For example, the server-side communication control unit 311d receives request information (which will be called "zone request information") for setting a new travel-permitted zone, or transmits first zone response information indicating the position of the first travel-permitted zone, second zone response information indicating the position of the second travel-permitted zone and non-permission response information.

A description will next be made about the dump-truck terminal device 26. The terminal-side control device 261 of the dump-truck terminal device 26 is provided with an autonomous travel control unit 261a, terminal-side communication control unit 261b, and a request information processing unit 261c.

The autonomous travel control unit 261a acquires the current position of the own vehicle from the position calculating device 29, and with reference to the map information of the terminal-side map information DB 266, performs control of the vehicle control devices 27 for allowing the own vehicle to travel in accordance with the second travel-permitted zone included in the second zone response information.

The terminal-side communication control unit 261b performs control of wireless communication to be made with the traffic control server 31. The terminal-side communication control unit 261b performs the transmission of the zone request information, and the reception of the second zone response information and non-permission response information.

The request information processing unit 261c determines, on the basis of the map information stored in the terminal-side map information DB 266 and the current position calculated by the position calculating device 29, whether the dump truck 20 has reached a point where a zone information requesting is to be transmitted, and upon reaching the request point, generates the zone request information and transmits it to the traffic control server 31 via the terminal-side communication control unit 261b.

As illustrated in FIG. 7, the terminal-side control device 761 of the manned-vehicle terminal device 76 is provided with a display control unit 761a, a terminal-side communication control unit 761b, and a request information processing unit 761c.

Upon reception of the first zone response information from the traffic control server 31, the display control unit 761a displays the position of the first travel-permitted zone on the terminal-side display device 763.

The terminal-side communication control unit 761b and request information processing unit 761c are similar in configuration to the dump-truck terminal device 26, and therefore their overlapping descriptions are eliminated. It is to be noted that the position information, which indicates the current position of the own vehicle as calculated by the position calculating device 79 mounted on the manned vehicle 70, is included in the zone request information and is transmitted to the traffic control server 31 via the terminal-side communication control unit 761b.

The dump truck allocation management unit 311a, travel-permitted zone setting unit 311b, dynamic path generation unit 311c and server-side communication control unit 311d, which the traffic control server 31 is provided with, are realized through the execution of a program, which realizes their functions, by the server-side control device 311 (hardware) illustrated in FIG. 3.

Similarly, the autonomous travel control unit 261a, terminal-side communication control unit 261b and request information processing unit 261c, which the dump-truck terminal device 26 is provided with, and the display control unit 761a, terminal-side communication control unit 761b and request information processing unit 261c, which the manned-vehicle terminal device 76 is provided with, are realized through the execution of programs, which realize their functions, by the respective terminal-side control device 261,761 (hardware) illustrated in FIG. 3. The individual elements configured by cooperation of the above-described hardware and software may be configured using ASIC (Application Specific Integrated Circuit) that can realize the functions of the respective elements.

Referring to FIGS. 8A, 8B and 8C, a description will next be made about travel-permitted zone setting processing by the traffic control server 31. As the first travel-permitted zone and second travel-permitted zone are the same in setting processing in their relationships with other travel-permitted zones located forward and rearward thereof, the first travel-permitted zone and second travel-permitted zone will hereinafter be referred simply as "the travel-permitted zone" if there is no need to distinguish them from each other. FIGS. 8A, 8B and 8C are diagrams illustrating travel-permitted zone setting processing, in which FIG. 8A shows travel-permitted zones set for the respective dump trucks, FIG. 8B shows a travel-permitted zone newly set for one of the dump trucks, and FIG. 8C shows a vacated zone.

Dump trucks 20-1, 20-2 illustrated in FIG. 8A are dump trucks that are traveling in the direction of arrow A. A travel-permitted zone 83*a* is a travel-permitted zone set for the dump truck 20-1. A travel-permitted zone 83*b* is a travel-permitted zone set for the dump truck 20-2. D1 is a remaining travel-permitted distance that indicates a distance along a travel route from the current position of the dump truck 20-1 to a forward boundary point (forward end) of the travel-permitted zone 83*a*. D2 is a travel permission request starting distance, at which the transmission of zone request information is to be started. The dump trucks 20-1, 20-2 will hereinafter be referred to as "the dump truck 20" unless they are not distinguished from each other.

The travel permission request starting distance D2 is a distance longer than a distance (which will hereinafter be called "the stoppable distance" and designated by "UVSL") in which the dump truck 20 can stop, and is defined, for example, as a distance of UVSL and a predetermined offset distance m added thereto. In this case, the travel permission request starting distance D2 can be expressed by the below-described formula (1). Further, UVSL is calculated on the basis of a distance in which the dump truck 20 can stop from its current speed, and can be expressed, for example, by the following formula (2).

[Formula 1]

$$D_2 = UVSL + m \quad (1)$$

where m: margin

[Formula 2]

$$UVSL = c\frac{Mv^2}{2f} \quad (2)$$

where c: coefficient set to determine the stoppable distance of dump truck
M: Mass of dump truck, including its payload
v: Current speed of dump truck
f: Braking force of dump truck The value of the predetermined offset distance m is set, for example, in view of time required in wireless communication and the frequency of incidence of troubles in wireless communication. The speed v of the dump truck 20 can be the current speed of the dump truck 20 as measured from wheel rpm or the like. As an alternative, it is possible to use a maximum permissible speed set for the current travel position of the dump truck 20 in the map information stored in the master map information DB 316 and terminal-side map information DB 266.

When the remaining travel-permitted distance D1 of the dump truck 20 has decreased to the travel permission request starting distance D2 or shorter, the dump truck 20 transmits zone request information to the traffic control server 31. The zone request information includes the current position information of the dump truck 20.

After reception of the zone request information from the dump truck 20-1, the travel-permitted zone setting unit 311*b* specifies the zone, in which the dump truck 20-1 exists (and which corresponds to the travel route between the adjacent nodes), on the basis of the position information included in the zone request information transmitted thereto. The travel-permitted zone setting unit 311*b* then gives a travel permission for a zone that extends forward over at least a travel-permitted length from the forward end of the zone, in which the dump truck 20-1 exists, in the advancing direction of the dump truck 20-1. If there is a zone given to another vehicle, however, the travel-permitted zone is given up to a point before the former zone.

In the example of FIG. 8B, the zone in which the dump truck 20-1 exists is a zone 90, and the zones included from its forward end over a travel-permission given length 95 are zones 91, 92, 93, 94. However, the zones 93, 94 have already been given as the travel-permitted zone 83*b* to the dump truck 20-2. Hence, candidates for a travel-permitted zone that can be newly set for the dump truck 20-1 are the zones 91, 92, but the zone 91 is included in the travel-permitted zone 83*a* already set for the dump truck 20-1. Therefore, the travel-permitted zone setting unit 311*b* sets only the zone 92 as a new travel-permitted zone.

The travel-permitted zone setting unit 311*b* cancels at a predetermined timing a zone, through which the dump truck 20 has already passed by, among zones for each of which a travel permission was given. Specifically, as shown in FIG. 8C, when a distance D4 from the forward end of the zone, which is to be canceled, to the dump truck 20-2 has increased to at least a predetermined travel permission canceling distance D3, the travel-permitted zone setting unit 311*b* cancels the zone. The canceled zone can then be set as a travel-permitted zone for the following dump truck 20-1.

In the above description, the processing that obtains a travel permission by transmitting a message, which requests the travel permission, when the remaining travel-permitted distance has decreased to the travel permission request starting distance or smaller is executed by the request information processing unit 261*c* in the dump-truck terminal device 26 or the request information processing unit 761*c* in the manned-vehicle terminal device 76.

When the manned vehicle 70 and the dump truck 20 pass each other on the haul road 60, their relative speed is high, and moreover, the distance between the vehicles is close. Interference of the manned vehicle 70 with the oncoming vehicle, for example, due to traveling of the manned vehicle 70 with a departure from the travel route may potentially be accompanied by severe damage. A travel permission restricted zone is therefore introduced to reduce damage upon traveling while passing each other as described above.

Figure 9A:
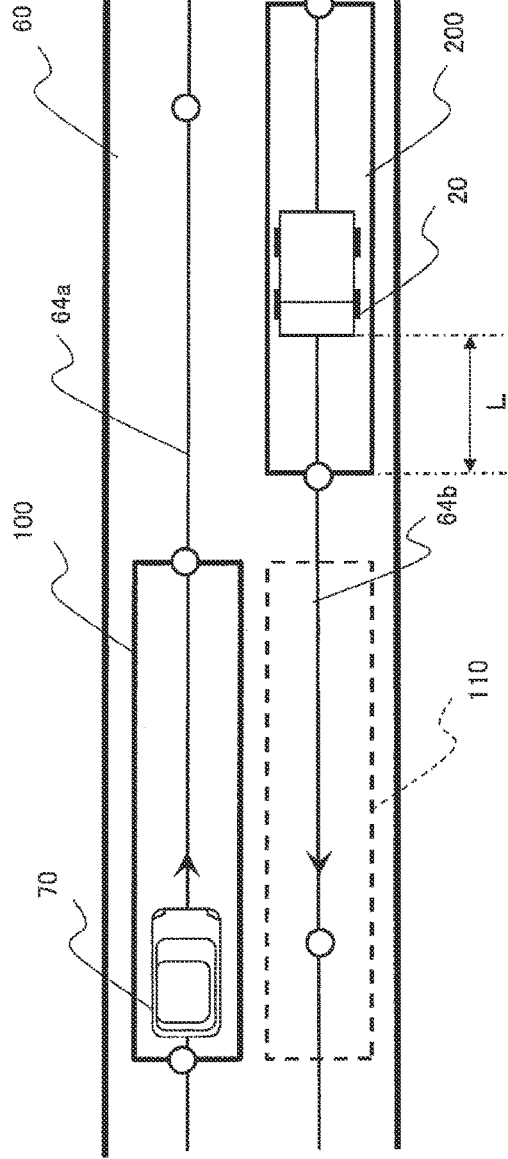
Figure 9B:
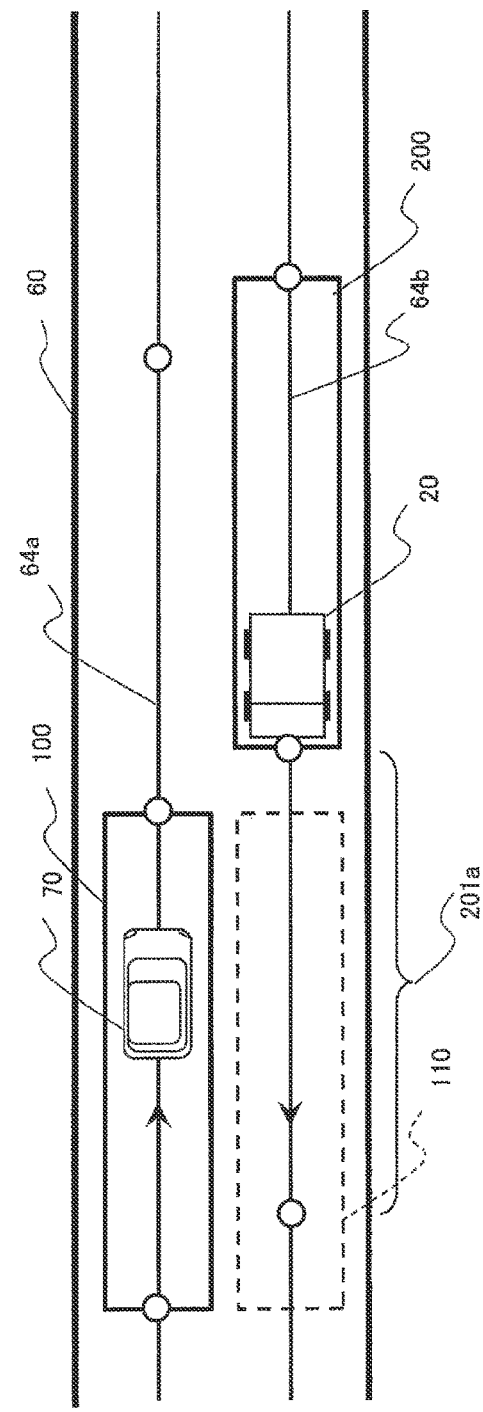

Processing at the traffic control server, which uses a travel permission restricted zone, will be described with reference to FIGS. 9A and 9B and FIGS. 10A and 10B. FIGS. 9A and 9B are diagrams illustrating setting examples of a travel permission restricted zone, in which FIG. 9A illustrates a state that the travel permission restricted zone does not overlap a travel-permitted zone for the oncoming vehicle, and FIG. 9B illustrates a state that the dump truck has stopped as the setting of a new travel-permitted zone was not feasible by being hampered with a travel permission restricted zone. FIGS. 10A and 10B are diagrams illustrating setting examples of a travel permission restricted zone, in which FIG. 10A illustrates a state that a travel permission restricted zone for the manned vehicle has been set overlapping a travel-permitted zone for the dump truck, and FIG. 10B illustrates a state that a travel permission restricted zone has been canceled and a new travel-permitted zone has been set for the dump truck. In FIGS. 9A through 10B, reference character 64*a* designates a travel route set in the approach lane, while reference character 64*b* designates a travel route set in the return lane.

As illustrated in FIG. 9A, upon setting a first travel-permitted zone 100 for the manned vehicle 70, a travel permission restricted zone 110 is set at a corresponding zone in the oncoming lane, specifically a zone that is in the oncoming lane and is parallel to the first travel-permitted zone 100. For the dump truck 20 traveling in the oncoming lane, on the other hand, a second travel-permitted zone 200 is assumed to have been set.

When the dump truck 20 has reached a point that the remaining travel-permitted distance in the second travel-permitted zone 200 is apart by a travel permission request starting distance L, the dump truck 20 transmits zone request information to request the setting of a next new travel-permitted zone. Because a zone 201a as a candidate for the next new travel-permitted zone is in overlap with the travel permission restricted zone 110 at this time, the next new travel-permitted zone cannot be set. Therefore, the dump truck 20 cannot obtain a new second travel-permitted zone, and stops at the forward boundary point of the second travel-permitted zone 200 (see FIG. 9B).

When the manned vehicle 70 has reached the permission request point in the currently-set, first travel-permitted zone 100, on the other hand, zone request information is transmitted to request the setting of a new travel-permitted zone.

At this time, the dump truck 20 is at a stop in FIG. 9B. A new first travel-permitted zone 101 is therefore set for the manned vehicle 70, thereby allowing the dump truck 20 to move to the first travel-permitted zone 101 so that the dump truck 20 can travel continuously (FIG. 10A). It is to be noted that, although a new travel permission restricted zone 111 is set in association with the setting of the first travel-permitted zone 101, this travel permission restricted zone 111 may overlap the dump truck 20 that is at a stop.

If the dump truck 20 is traveling at a vehicle speed greater than the predetermined vehicle speed threshold in the second travel-permitted zone 200 set for the own vehicle when the manned vehicle 70 has transmitted the zone request information, no new first travel-permitted zone is set for the manned vehicle 70 and the manned vehicle 70 is allowed to stop at the forward boundary point of the currently-set travel-permitted zone 100.

When the manned vehicle 70 has traveled further from its position in FIG. 10A and the distance from the current position of the manned vehicle 70 to the backward boundary point of a first travel-permitted zone 102 has increased to at least the travel permission canceling distance, the first travel-permitted zones 100,101 are canceled. Concurrently with their cancellation, the travel permission restricted zones 110,111 are also canceled. Therefore, a travel permission is given to the dump truck 20 (a new travel-permitted zone 201 is set), and the dump truck 20 resumes traveling (FIG. 10B).

By the foregoing processing, the dump truck 20 remains in a stopped state while the manned vehicle 70 is traveling in the oncoming lane. It is, accordingly, possible to reduce the risk of damage upon interference of the manned vehicle 70 and the dump truck 20 due to a departure or the like from the travel lane.

Figure 11:
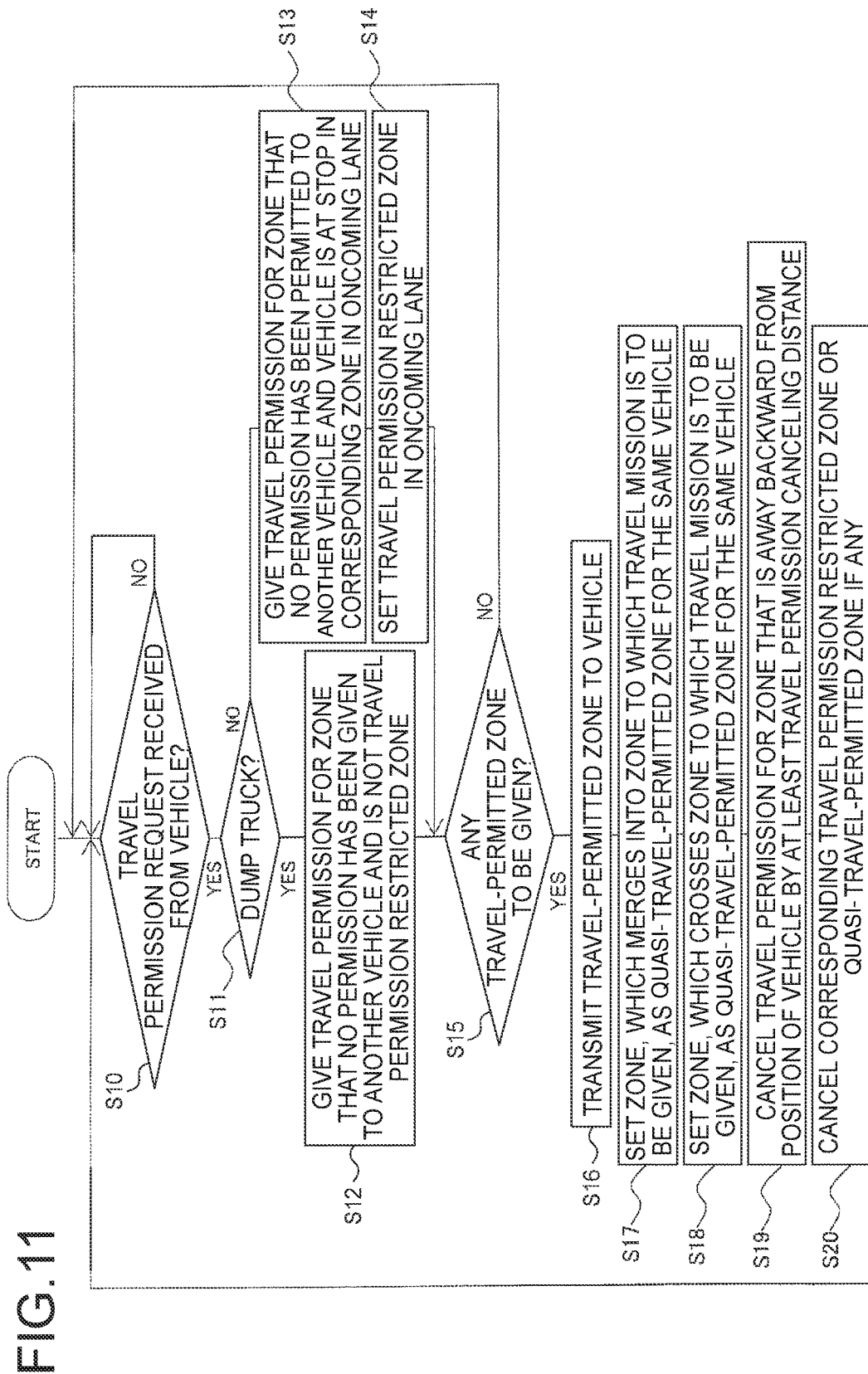
FIG. 11 is a flow chart illustrating the flow of processing at the traffic control system according to the first embodiment.

With reference to FIG. 11, a description will be made of the flow of processing at the traffic control system according to this embodiment. FIG. 11 is a flow chart illustrating the flow of processing at the traffic control system according to the first embodiment.

First, if a travel permission request is transmitted from the dump truck 20 or manned vehicle 70, the traffic control server 31 receives zone request information (S10/Yes). If the vehicle that transmitted the zone request information is the dump truck 20 (S11/Yes), the travel-permitted zone setting unit 311b sets, by using the current position (which is contained in the zone request information) of the dump truck 20 as received and the zone information and the map information in the master map information DB 316, a new travel-permitted zone on the map information of the master map information DB 316 for a partial zone on the travel lane, the partial zone extending over at least a travel-permission given length from the forward boundary point of the travel-permitted zone, in which the dump truck 20 exists, in the advancing direction of the dump truck 20 insofar as no travel permission for the partial zone has been given to another vehicle and the partial zone does not overlap the travel permission restricted zone or, if there is a travel-permitted zone for which a permission has been given to another dump truck, for a partial zone extending up to a point before the travel-permitted zone (S12).

On the other hand, if the vehicle that transmitted the zone request information is the manned vehicle 70 (S11/No) the travel-permitted zone setting unit 311b sets, by using the current position (which is contained in the zone request information) of the manned vehicle 70 as received and the zone information and the map information in the master map information DB 316, a new travel-permitted zone on the master map information DB 316 for a partial zone on the travel lane, the partial zone extending over at least a travel-permission given length from the forward boundary point of the travel-permitted zone, in which the manned vehicle 70 exists, in the advancing direction of the manned vehicle 70 insofar as no permission for the partial zone has been given to another vehicle and, if the dump truck 20 exists in a corresponding zone in the oncoming lane, the dump truck 20 is at a stop or, if there is a zone for which a permission has been given to another dump truck, for a partial zone extending up to a point before the travel-permitted zone (S13). Concurrently with the above-described setting, the travel-permitted zone setting unit 311b sets a travel permission restricted zone at a partial zone on the oncoming lane, the partial zone corresponding to the new travel-permitted zone (S14).

If there is any travel-permitted zone to be given in step S12 or step S13 (S15/Yes), the server-side communication control unit 311d transmits first zone response information or second zone response information, which indicates a zone where traveling is to be permitted, to the vehicle that transmitted the zone permit request (S16).

If there is a zone which merges into the travel-permitted zone, the travel-permitted zone setting unit 311b sets, on the map data in the master map information DB 316, the zone as a quasi-travel-permitted zone for the same vehicle (the manned vehicle 70 that has become a target of setting if the first travel-permitted zone has been set, or the dump truck 20 that has become a target of setting if the second travel-permitted zone has been set) (S17). If there is a zone which crosses a zone for which a travel permission is to be given, the travel-permitted zone setting unit 311b sets the zone as a quasi-travel-permitted zone for the same vehicle on the map data in the master map information DB 316 (S18). No limitation is imposed on the processing order of these steps S17,S18.

The quasi-travel-permitted zone is a travel-permitted zone to be collaterally set in the case of merging or crossing, and is to control for excluding the existence itself of a vehicle. In this sense, the quasi-travel-permitted zone has a concept close to a general travel-permitted zone (the travel-permitted zone set in step S12 or step S13), but is set merely in the traffic control server 31 and is not transmitted to the above-described same vehicle. For the distinction from general travel-permitted zones, the term "quasi-travel-permitted zone" is hence used in this embodiment.

The quasi-travel-permitted zone is a travel-permitted zone for blocking the entry of another vehicle when the vehicle merges into the travel lane or crosses the travel lane, and can be considered to be a kind of travel permission restricted zone. If another vehicle already exists in a zone for which a travel permission should be restricted (a zone where a quasi-travel-permitted zone is intended to be set), the quasi-travel-permitted zone cannot be set there no matter whether another vehicle is traveling or is at a stop. The travel permission restricted zone, on the other hand, may not become exclusive in some instances insofar as another vehicle is at a stop. A quasi-travel-permitted zone and a travel permission restricted zone are different in this regard.

After setting the quasi-travel-permitted zone, the travel-permitted zone setting unit 311*b* writes its forward boundary point and backward boundary point to the zone information in the zone information DB317.

Figure 12A:
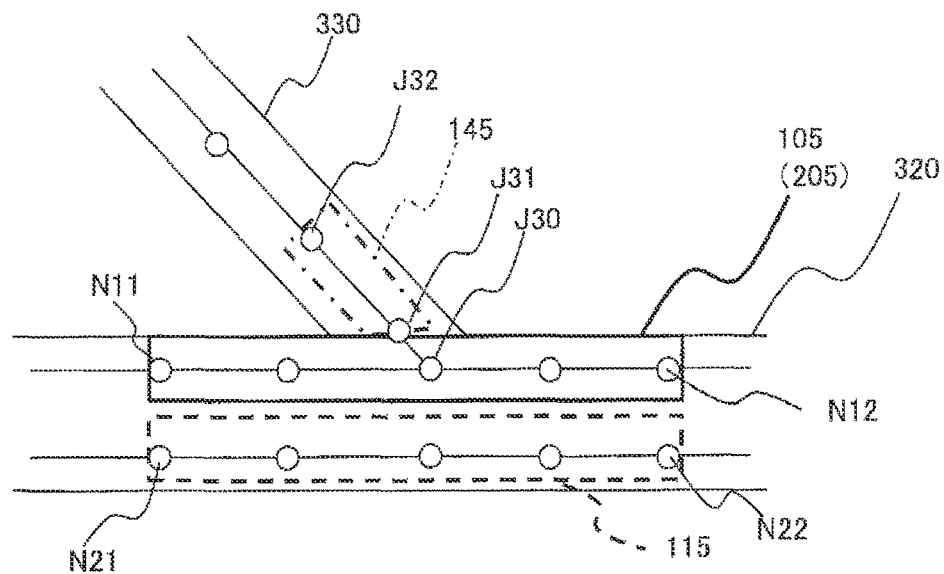
Figure 12B:
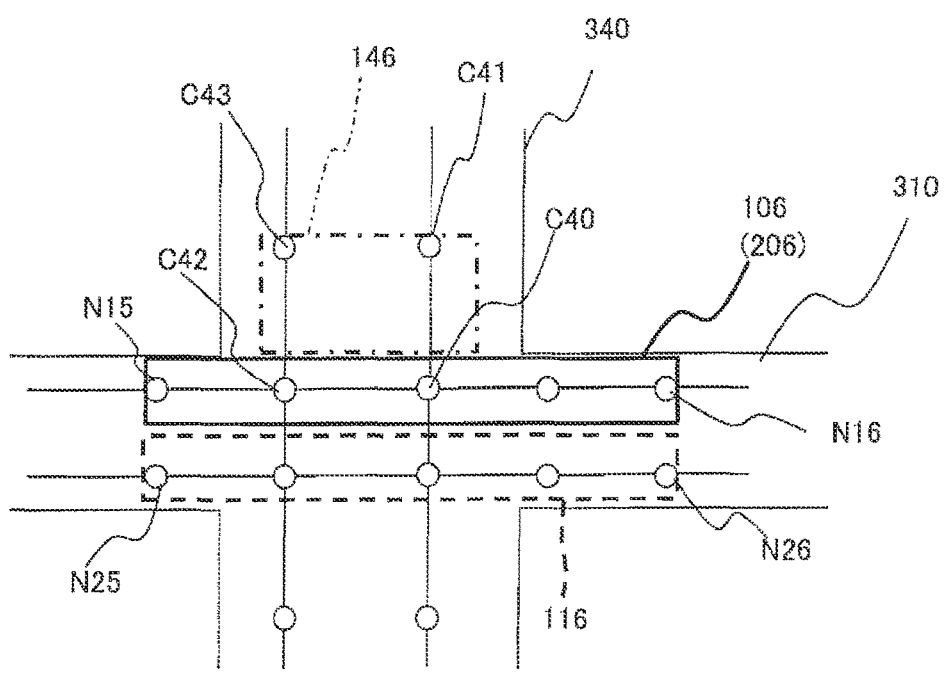

Referring to FIGS. 12A and 12B, a description will be made about processing that sets a quasi-travel-permitted zone at a merging point, and about processing that sets a quasi-travel-permitted zone at a crossing point. FIGS. 12A and 12B are diagrams showing setting examples of a quasi-travel-permitted zone, in which FIG. 12A shows an example of merging and FIG. 12B shows an example of crossing.

A node J30 on an approach lane (main lane) 320 as shown in FIG. 12A indicates a merging point of travel routes set in the approach lane 320 and a merging lane (branch lane) 330, respectively. Further, a node J31 is an entering point from the merging lane 330 into the approach lane 320. In this case, the node J30 and the node J31 and a node J32, which are close to the node J30 and are on the merging lane 330, are stored beforehand in association with one another in the master map information DB 316.

After a first travel-permitted zone 105 with the node J30 included therein has been set in the approach lane 320, the travel-permitted zone setting unit 311*b* sets, with reference to the master map information DB 316, a quasi-travel-permitted zone 145 so that all the nodes on the merging lane 330, the nodes being in association with the node J30, are included. It is to be noted that reference character 115 in the figure designates a travel permission restricted zone set collaterally with the first travel-permitted zone 105 by the travel-permitted zone setting unit 311*b*.

In the case of the crossing, a quasi-travel-permitted zone is set by similar processing as in the case of the merging. Described specifically, as shown in FIG. 12B, individual nodes C40,C42 at a crossing point on an approach lane (main lane) 310 and individual nodes C41,C43 on a crossing lane (branch lane) 340 are associated with one another beforehand. After the travel-permitted zone setting unit 311*b* sets a first travel-permitted zone 106 with the C40,C42 included therein, the travel-permitted zone setting unit 311*b* also sets, in association with the above-described setting, a quasi-travel-permitted zone with the nodes C41 and C43 included therein. It is to be noted that reference character 116 designates a travel permission restricted zone set in association with the travel-permitted zone 106.

In the foregoing, the description was made about the examples in which the quasi-travel-permitted zones 145,146 were set in association with the travel-permitted zones 105,106. If second travel-permitted zones 205,206 are set from a node N11 to a node N12 and from a node N15 to a node N16, respectively, the quasi-travel-permitted zones 145,146 are set in a similar manner as described above. If the second travel-permitted zones 205,206 have been set, the travel permission restricted zones 115,116 are not set.

Referring back to FIG. 11, if the distance from the current position of the vehicle to the forward end of the travel-permitted zone, through which the vehicle has already passed, is at least equal to a travel permission canceling distance, the travel-permitted zone setting unit 311*b* cancels the travel permission for the passed zone on the map data (S19).

Further, if there is a travel permission restricted zone or quasi-travel-permitted zone corresponding to the travel-permitted zone canceled as described above, the travel-permitted zone setting unit 311*b* also cancels it (S20). The traffic control server 31 repeats the above processing.

According to this embodiment, if the dump truck exists in the oncoming lane, the manned vehicle does not pass by the traveling dump truck while the manned vehicle is traveling. Even if interference takes place, the extent of damage can be further reduced by lowering the relative speed.

After the on-board terminal device mounted on the manned vehicle and dump trucks have each obtained a travel-permitted zone, the processing is to be performed in its entirety at each on-board terminal device only. Therefore, even if wireless communication with the traffic control server is lost, each vehicle can still continue traveling to the end of the travel-permitted zone, thereby enabling to avoid a reduction in work efficiency.

Second Embodiment

A second embodiment avoids interference between a traveling manned vehicle and a traveling unmanned vehicle by invalidating a partial zone in map data instead of setting a travel permission restricted zone and quasi-travel-permitted zone. About similar configurations and processing as in the first embodiment, their overlapping descriptions are eliminated.

Figure 13A:
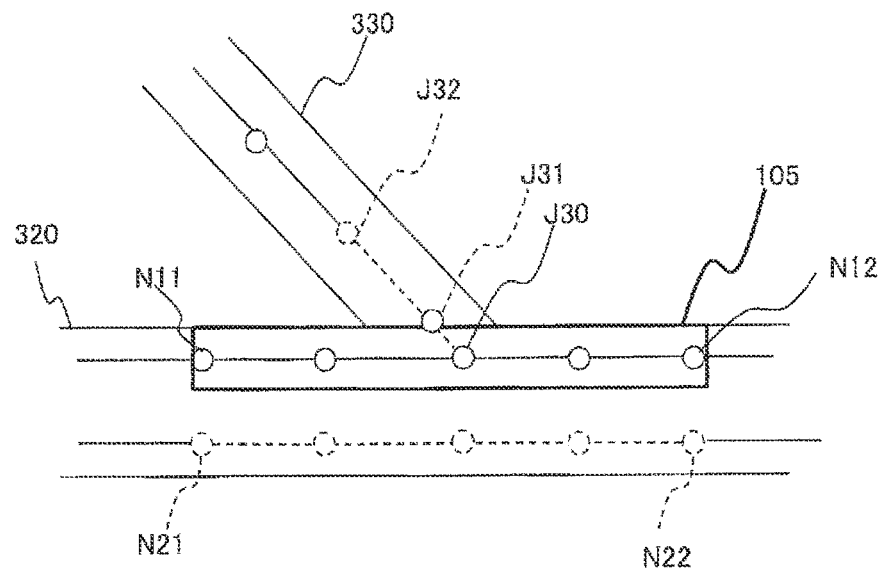
Figure 13B:
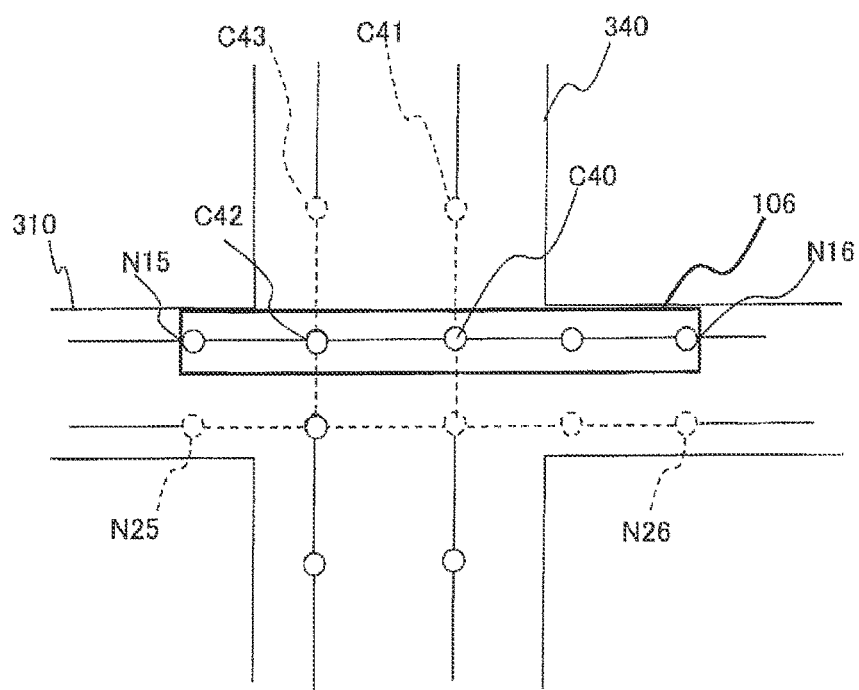

In this embodiment, the travel-permitted zone setting unit 311*b* performs invalidation of a part of the map data instead of the setting of the travel permission restricted zone and quasi-travel-permitted zone in the first embodiment. Referring to FIGS. 13A and 13B, a description will hereinafter be made about the second embodiment. FIGS. 13A and 13B are diagrams illustrating invalidation of the map data, in which FIG. 13A illustrates an example including a merging point and FIG. 13B illustrates an example including a crossing point.

As illustrated in FIG. 13A, in this embodiment, the travel-permitted zone setting unit 311*b* does not set a travel permission restricted zone in step S14 of FIG. 11; and instead, selects a node N22 on an oncoming lane, the node N22 corresponding to the node N12 of the forward boundary point of a first travel-permitted zone 105, and a node N21 on the oncoming lane, the node N21 corresponding to the node N11 of the backward boundary point of the first travel-permitted zone 105, on the map data in the master map information DB 316, and invalidates the map data that represent a travel route from the node N22 to the node N21. In FIGS. 13A and 13B, the sublinks and nodes in the invalidated part are indicated by dashed lines. The term "invalidate" as used herein means to change a partial zone in an oncoming lane, the partial zone corresponding to a travel-permitted zone set for a manned vehicle, into a zone where no new travel-permitted zone can be set for a dump truck (unmanned vehicle).

If a merging point is included in the first travel-permitted zone in this embodiment, the travel-permitted zone setting unit 311*b* also invalidates map data up to the nodes J31,J32 on the merging lane 330, the nodes J31,J32 being associated with the node J30 of the merging point.

In FIG. 13B, the travel-permitted zone setting unit 311*b* also selects nodes N25,N26 on the oncoming lane, the node N25 corresponding to the node N15 of the forward boundary point of the first travel-permitted zone 106 and the node N26 corresponding to the node N16 of the backward boundary point of the first travel-permitted zone 106, and invalidates map data that represent a travel route from the node N25 to the node N26.

If a crossing point is included in the travel-permitted zone 106, the travel-permitted zone setting unit 311*b* selects the nodes C41,C43 on the crossing road, the nodes C41,C43 being associated with the nodes C40,C42, respectively, at the crossing point, and invalidates the map data from the node C40 to the node C41 and from the node C42 to the node C43. The above-described invalidation of the map data is performed by internal processing at the traffic control server 31. To show the operator that the reason for the stop of the dump truck 20 resides in the invalidation of the map data, FIGS. 13A and 13B may be displayed on the screen of the server-side display device 313 in the manner that the invalidated map information can be distinguished from an effective zone.

In this embodiment, the map data of the partial zone on the oncoming lane, the partial zone corresponding to the travel-permitted zone set for the manned vehicle, and the map data of the entry routes to the merging point and crossing point are invalidated. As no new travel-permitted zone is set while the map data are kept invalid, the traveling manned vehicle and the traveling unmanned vehicle can be avoided from passing each other.

Third Embodiment

When a traveling manned vehicle passes by an oncoming unmanned vehicle on an oncoming lane, a third embodiment allows the unmanned vehicle to travel at a reduced speed rather than stopping the unmanned vehicle. About the same configurations and processing as in the first embodiment, their overlapping descriptions are eliminated.

In this embodiment, in step S12 illustrated in FIG. 11, a travel permission is supposed to be also given for the zone that is the travel permission restrained zone, and to the dump truck 20, it is transmitted that the travel permission is for the travel-permitted zone at the travel permission restrained zone. The dump truck 20 allows the dump truck 20 to travel at a speed (hereafter called "the predetermined low speed") not greater than a predetermined value when the dump truck 20 travels in the travel-permitted zone at the travel permission restricted zone. Specifically, if information that indicates that the travel permission is the travel-permitted zone at the travel permission restricted zone is included in second zone response information and the dump-truck terminal device 26 receives the second response information, the vehicle control devices 27 may control so that the dump truck 20 is allowed to travel at the predetermined low speed. Further, the travel-permitted zone setting unit 311*b* may transmit the second zone response information, which the travel-permitted zone setting unit 311*b* itself produces, by including information that indicates the predetermined low speed as the traveling speed of the dump truck 20 in the travel-permitted zone.

This embodiment may be programmed to give a travel permission in step S13 of FIG. 11 if the dump truck 20 exists in the corresponding zone of the oncoming lane and the speed of the dump truck 20 is not higher than the predetermined low speed.

According to this embodiment, while the manned vehicle 70 is traveling in the oncoming lane, the dump truck 20 remains in a state that it travels at the predetermined low speed or lower. It is, accordingly, possible to reduce the risk of damage upon interference of the manned vehicle 70 and the dump truck 20 due to a departure or the like from the travel lane.

The above-described embodiments merely exemplify the present invention, and are not intended to limit the present invention. Moreover, various modifications are feasible without departing from the scope of the present invention.

In the above-described first embodiment, for example, the travel permission restricted zone is introduced to avoid interference when the manned vehicle 70 and the dump truck 20 cross each other on the haul road 60. However, the mining dump truck has a large width, so that the lateral inter-vehicle distance becomes narrow upon passing by the oncoming manned vehicle 70. When dump trucks pass each other, a travel permission restricted zone may therefore be also introduced to avoid interference.

As an example of such a modification, an unloaded dump truck may be allowed to preferentially travel to shorten the wait time for the excavator 10 from the viewpoint of improving the productivity at the mine. In this case, the lane toward the excavation site may be defined as an "approach lane", and the lane toward the dumping site may be defined as a "return lane", both on the map data. As the dump truck on the approach lane is obviously unloaded from the definitions, the priority in the traveling order of the unloaded dump truck may be set higher than a loaded dump truck to determine the unloaded dump truck as a vehicle for which the first travel-permitted zone is to be set. In contrast, to reduce a load on brakes of the loaded dump truck having a large body weight, the priority for the loaded dump truck may be set high to determine it as a vehicle for which the first travel-permitted zone is to be set. In the above-described example, the approach lane and return lane are defined on the map data. However, information with the distinction of loaded or unloaded included therein may be incorporated in the travel state information of the dump truck, and the travel state information may then be transmitted to the traffic control server 31 to determine, depending on the state of loading, the vehicle for which the first travel-permitted zone is to be set.

As another example, if dump trucks that can select an autonomous travel mode or a manual travel mode are traveling, those which are operated in the manual travel mode by operators may be allowed to preferentially travel. If a travel-permitted zone is newly set for each dump truck in the manual travel mode in the above-described case with reference to its travel mode in the vehicle management information, a travel permission restricted zone may be set collaterally.

The above-descriptions were made taking dump trucks as examples of unmanned vehicles. However, the unmanned vehicles shall not be limited to such dump trucks, and can be haulage vehicles such as tank trucks, and the uses of the unmanned vehicle and manned vehicles shall not be limited to the foregoing. Further, the manned vehicle and unmanned vehicles are not intended to be limited to vehicles, and can be any carriers insofar as they can travel. Therefore, the term "manned vehicle" can include manned working machines without wheels, and the term "unmanned vehicle" can include unmanned working machines without wheels.

When the numbers of elements and the like (including the numbers of parts or components, numerical values, amounts, ranges, and so on) are referred to in the above-described embodiments, they shall not be limited to such specific numbers and may be greater or smaller than them unless specifically indicated or unless apparently limited to such specific numbers in principle. In addition, the constituent elements (including processing steps and the like) included in the above-described embodiments are not absolutely essential unless specifically indicated or unless clearly considered to be essential in principle, and may be omitted as needed.

LEGENDS

1 Traffic control system
10 Excavator
20,20-1,20-2 Unmanned dump trucks (unmanned vehicles)
26 Dump-truck terminal device
31 Traffic control server
70 Manned vehicle
76 Manned-vehicle terminal device

The invention claimed is:

1. A traffic control server that performs traffic control of a first vehicle, which is traveling in an approach lane, and a second vehicle, which is traveling in a return lane, the second vehicle being different in attribute from the first vehicle, and the approach lane and the return lane being provided in parallel to each other in a mine site, comprising:
a central processing unit (CPU);
a storage device; and
a communication device,
wherein the storage device and the communication device are connected to the CPU,
wherein the storage device stores map information of a travel route and zone information that indicates travel-permitted zones given to the respective vehicles,
wherein the zone information includes information indicating a first travel-permitted zone as a partial zone, where the first vehicle is allowed to travel, in the approach lane, a travel permission restricted zone that is set in the return lane in association with the first travel permitted zone, where the second vehicle is restricted to travel, and a second travel-permitted zone as another partial zone, where the second vehicle is allowed to travel, in the return lane, respectively, and
wherein the storage device stores one or more programs that when executed by the CPU configure the CPU to:
upon receiving a new zone setting request from at least one of the first vehicle and the second vehicle via the communication device, execute a new setting and a cancellation of at least one of the first travel permitted zone, the travel permission restricted zone and the second travel permitted zone, based on the zone information, and store the new setting and the at least one cancellation in the storage device as new zone information,
upon setting the first travel permitted zone, set a partial zone parallel to the first travel permitted zone in the return lane as the travel permission restricted zone,
after a new first travel permitted zone is set in the approach lane based on the travel of the first vehicle:
set a new travel permission restricted zone, the new travel permission restricted zone being set in association with the new first travel permitted zone,
upon determining a distance from a current position of the first vehicle to a rear end of the first travel permitted zone that the first vehicle has already passed is a predetermined travel permission canceling distance or more, cancel the first travel permitted zone, through which the first vehicle has already passed, and
cancel the travel permission restricted zone in association with the first travel permitted zone that the first vehicle has already passed,
upon receiving a request for setting a new second travel permitted zone from the second vehicle:
upon determining the travel permission restrict zone is set to a zone in the return lane that the second vehicle requests to set the new second travel permitted zone, restrict the setting of the new second travel permitted zone in the zone of the return lane, and
upon determining that the travel permission restrict zone that is set to the zone of the return lane that the second vehicle requests to set the new second travel permitted zone is cancelled, set the new second travel permitted zone in the return lane, and
instruct the communication device to transmit setting information including the new zone information indicating each zone newly set to the first vehicle and the second vehicle.

2. The traffic control server according to claim 1, wherein:
the programs stored in the storage device when executed by the CPU further configure the CPU to:
upon setting a new first travel-permitted zone, restrict the setting of the new first travel permitted zone if the second vehicle traveling in a still further partial zone corresponding to the new first travel permitted zone in the return lane has a vehicle speed greater than a predetermined vehicle speed threshold.

3. The traffic control server according to claim 2, wherein:
the predetermined vehicle speed threshold is zero.

4. The traffic control server according to claim 1, wherein:
the zone information further includes information specifying a quasi-travel-permitted zone,
the approach lane includes a merging point or a crossing point and,
the return lane includes a merging point or a crossing point; and
the programs stored in the storage device when executed by the CPU further configure the CPU to:
after setting the first travel permitted zone with the merging point or crossing point included therein, set an entry zone to the approach lane, the entry zone being on a merging lane that merges into the approach lane or a crossing lane that crosses the approach lane, as a quasi-travel-permitted zone associated with the first travel-permitted zone to restrict entry of any of the vehicles into the quasi-travel-permitted zone, and
after setting the second travel permitted zone with the merging point or crossing point included therein, set an entry zone to the return lane, the entry zone being on a merging lane that merges into the return lane or a crossing lane that crosses the return lane, as the quasi-travel-permitted zone associated with the second travel-permitted zone to restrict entry of any of the vehicles into the false travel-permitted zone.

5. The traffic control server according to claim 1, wherein:
the storage device further stores map data, which indicate positions of the approach lane and return lane, and
the programs stored in the storage device when executed by the CPU further configure the CPU to set the first travel permitted zone and second travel permitted zone with reference to the map data, and after the setting of the first travel-permitted zone, invalidate the map data for a further partial zone, which is parallel to the first travel-permitted zone so set, in the return lane to restrict setting of a new second travel-permitted zone on the invalidated map data.

6. A traffic control system including a traffic control server that performs traffic control of a first vehicle, which is traveling in an approach lane, and a second vehicle, which is traveling in a return lane, the second vehicle being different in attribute from the first vehicle the approach lane and the return lane being provided in parallel to each other in a mine site, first onboard terminal device mounted on the first vehicle, and second onboard terminal device mounted on the second vehicle, the traffic control server and the first onboard terminal device and second onboard terminal device being connectable for communication, wherein:

the traffic control server comprises:
a CPU;
a storage device; and
a server-side communication device,
wherein the storage device and the server-side communication device are connected to the CPU,
wherein the storage device stores map information of a travel route and zone information that indicates travel-permitted zones given to the respective vehicles,
wherein the zone information includes information indicating a first travel-permitted zone as a partial zone, where the first vehicle is allowed to travel, in the approach lane, a travel permission restricted zone that is set in the return lane in association with the first travel-permitted zone, where the second vehicle is restricted to travel, and a second travel-permitted zone as another partial zone, where the second vehicle is allowed to travel, in the return lane, respectively, and
wherein the storage device stores one or more programs that when executed by the CPU configure the CPU to:
upon receiving a new zone setting request from at least one of the first vehicle and the second vehicle via the server-side communication device, execute a new setting and a cancellation of at least one of the first travel-permitted zone, the travel permission restricted zone and the second travel-permitted zone, based on the zone information, and store the new setting and the at least one cancellation in the storage device as new zone information,
upon setting the first travel permitted zone, set a partial zone parallel to the first travel permitted zone in the return lane as the travel permission restricted zone,
after a new first travel permitted zone is set in the approach lane based on the travel of the first vehicle:
set a new travel permission restricted zone, the new travel permission restricted zone being set in association with the new first travel permitted zone,
upon determining a distance from a current position of the first vehicle to a rear end of the first travel permitted zone that the first vehicle has already passed is a predetermined travel permission canceling distance or more, cancel the first travel permitted zone, through which the first vehicle has already passed, and
cancel the travel permission restricted zone in association with the first travel permitted zone that the first vehicle has already passed by,
upon receiving a request for setting a new second travel permitted zone from the second vehicle:
upon determining the travel permission restrict zone is set to a zone in the return lane that the second vehicle requests to set the new second travel permitted zone, restrict the setting of the new second travel permitted zone in the zone of the return lane, and
upon determining that the travel permission restrict zone that is set to the zone of the return lane that the second vehicle requests to set the new second travel permitted zone is cancelled, set the new second travel permitted zone in the return lane,
upon setting the first travel permitted zone, transmit first zone response information, which indicates the first travel-permitted zone, to the first onboard terminal device via the server-side communication device, and
upon setting the second travel permitted zone, transmit second zone response information, which indicates the second travel-permitted zone, to the second onboard terminal device via the server-side communication device,
wherein the first onboard terminal device comprises:
a first terminal-side CPU;
a first terminal-side storage device;
a first terminal-side display device; and
a first terminal-side communication device,
wherein the first terminal-side storage device, the first terminal-side display device and the first terminal-side communication device are connected to the first terminal-side CPU,
wherein the first terminal-side storage device stores one or more programs that when executed by the first terminal-side CPU configure the first terminal-side CPU to display the first zone response information received from the first terminal-side communication device on the first terminal-side display device,
wherein the second onboard terminal device comprises:
a second terminal-side CPU,
a second terminal-side storage device, and
a second terminal-side communication device,
wherein the second terminal-side storage device, and the second terminal-side communication device are connected to the second terminal-side CPU, and
wherein the second terminal-side storage device stores one or more programs that when executed by the second terminal-side CPU configure the second terminal-side CPU to issue a travel control instruction to a vehicle control device based on the second zone response information received from the second terminal-side communication device.

7. The traffic control system according to claim 6, wherein:
the first vehicle is a manned vehicle operated by an operator on board on the manned vehicle, and the second vehicle is an autonomously-traveling vehicle.

8. The traffic control system according to claim 6, wherein:
the first vehicle is an unloaded dump truck and the second vehicle is a dump truck with a payload carried thereon, or the first vehicle is a dump truck with a payload carried thereon and the second vehicle is an unloaded dump truck.

* * * * *